United States Patent
Arai

(10) Patent No.: US 6,625,618 B1
(45) Date of Patent: Sep. 23, 2003

(54) MAINTENANCE MANUAL INTERFACE SYSTEM AND MEDIUM CONTAINING A COMPUTER PROGRAM PRODUCT THEREOF

(76) Inventor: Tsunehiko Arai, 4-22, Shoudo 2-chome, Sakae-ku, Yokohama, Kanagawa (JP)

( * ) Notice: Subject to any disclaimer, the term of this patent is extended or adjusted under 35 U.S.C. 154(b) by 420 days.

(21) Appl. No.: 09/736,283

(22) Filed: Dec. 15, 2000

(51) Int. Cl.[7] ............................................. G06F 17/30
(52) U.S. Cl. .................................................. 707/104.1
(58) Field of Search ............................... 707/3, 4, 102, 707/104.1; 361/683; 399/24; 434/372, 374; 700/83, 95, 97, 174; 701/35

(56) References Cited

U.S. PATENT DOCUMENTS

| | | | | |
|---|---|---|---|---|
| 5,223,895 A | * | 6/1993 | Saitoh | 399/24 |
| 6,125,312 A | * | 9/2000 | Nguyen et al. | 701/35 |
| 6,138,056 A | * | 10/2000 | Hardesty et al. | 700/174 |
| 6,356,437 B1 | * | 3/2002 | Mitchell et al. | 361/683 |

* cited by examiner

Primary Examiner—Diane D. Mizrahi
Assistant Examiner—Apu Mofiz
(74) Attorney, Agent, or Firm—Greenblum & Bernstein, P.L.C.

(57) ABSTRACT

Total management blocks each consisting of a total management diagram and a total management drawing, partial management diagrams and drawings showing details of respective components of the total management diagrams and drawings, a detailed information associated with the partial management diagrams and drawings, and a manual information associated with the partial management diagrams and drawings are stored in a nonvolatile storage unit 5. This enables to easily retrieve a manual information through the total management diagrams/drawings and the partial management diagrams/drawings which are arranged in a hierarchy.

10 Claims, 25 Drawing Sheets

FIG. 9

DATE
TIME

ATA

| 5 | 21 | 22 | 23 | 24 | 25 | 26 | 27 | 28 | 29 | 30 |
|---|---|---|---|---|---|---|---|---|---|---|
| 31 | 32 | 33 | 34 | 35 | 36 | 38 | 45 | 46 | 49 | 52 |
| STR | 71 | 72 | 73 | 74 | 75 | 76 | 77 | 78 | 79 | 80 |

TABLE OF CONTENTS

| LOCATION SYS FLOW | CONTROL DISPLAY | MESSAGE | FAULT ISOLATION | MMEL DDG | NO DISPATCH | IPC | REMOVAL INSTALL | TOOL EQUIPT | ADJUST TEST | CHECK LIST | TECHNIC INFO |

FIG.10

DATE
TIME

ATA

| 5 | 21 | 22 | 23 | 24 | 25 | 26 | 27 | 28 | 29 | 30 |
|---|----|----|----|----|----|----|----|----|----|----|
| 31 | 32 | 33 | 34 | 35 | 36 | 38 | 45 | 46 | 49 | 52 |
| STR | 71 | 72 | 73 | 74 | 75 | 76 | 77 | 78 | 79 | 80 |

TABLE OF CONTENTS

| LOCATION SYS FLOW | CONTROL DISPLAY | MESSAGE | FAULT ISOLATION | MMEL DDG | NO DISPATCH | IPC | REMOVAL INSTALL | TOOL EQUIPT | ADJUST TEST | CHECK LIST | TECHNIC INFO |

FIG. 17

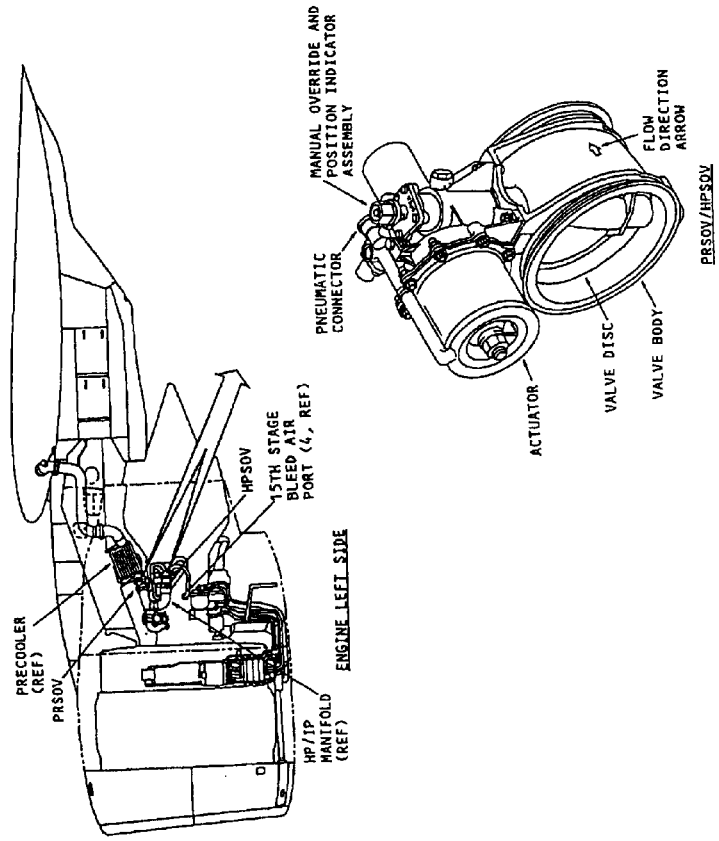

ENGINE AIR SUPPLY SYSTEM - HIGH PRESSURE SHUTOFF VALVE / PRESSURE REGULATING & SHUTOFF VALVE

Purpose

The high pressure shutoff valve (HPSOV) controls the direction of flow and the pressure of the bleed air from the high stage of the high pressure compressor.

The pressure regulating and shutoff valves (PRSOV) control the direction of flow and the air pressure to the pneumatic distribution system.

Physical Description

The HPSOV and PRSOV are the same. They are of the spring loaded closed, pneumatically-operated type of valve. The valves have these parts:

- Pneumatic connector
- Manual override and position indicator assembly
- Flow direction arrow
- Valve body
- Valve disc
- Actuator.

The valves do not have any electrical parts.

Location

The HPSOV is on the left side of the engine core at the 9:30 position. The HPSOV is in the engine ducting between the HP duct and the HP/IP manifold downstream of the fifteenth stage bleed air ports.

The PRSOV is on the left side of the engine core above the HPSOV at the 11:45 position. It is between the HP/IP manifold and the precooler.

Training Information Point

Use the manual override and position indicator assembly to lock the valve in the closed position.

Each valve has a flow direction arrow and alignment marks (not shown). The arrow and alignment marks help install the valves correctly. A male flange and a female flange prevent incorrect installation.

EFFECTIVITY 36    00

MAINTENANCE MANUAL INTERFACE SYSTEM AND MEDIUM CONTAINING A COMPUTER PROGRAM PRODUCT THEREOF

BACKGROUND OF THE INVENTION

1. Field of the Invention

The present invention relates to a maintenance manual interface system for easily identifying a reference paragraph of a maintenance manual according to a maintenance request information as well as a medium containing a computer program product constituting this system utilizing a personal computer or the like.

2. Description of the Related Art

Maintenance of a machine having numerous components and highly-sophisticated functions, especially maintenance of transportation means affecting human lives should be performed based on a manual issued by the manufacture of the machine.

In the case of an aviation company, a maintenance manual used for maintenance of an aircraft is prepared basically by a manufacturer of the aircraft, which has been corrected to a certain degree by the aviation company and submitted to a government. At the stage when the manual is approved by the government, the manual becomes an authorized maintenance manual (basic document).

However, since this maintenance manual has been basically prepared by the aircraft manufacturer, it contains sufficient information on technical data and specification associated with the respective components but it usually does not contain sufficient information on a maintenance procedure.

As a result, even when an error detector provided in an aircraft has identified an abnormal component, it may be difficult to find the place where the component is located. Moreover, even when the location is found, there may be no information on a procedure required for detaching and attaching the component.

Furthermore, when exchanging a component or ordering a component, a corresponding parts ID number should specified by referencing an illustrated parts catalogue contained in the manual issued by the aircraft manufacturer. This parts catalogue usually consists of enormous pages and is not always edited systematically. Accordingly, retrieval of an ID number requires a plenty of time. Moreover, some components (parts) look very similar to one another and there is often a case that an incorrect ID number is specified.

The basic reason causing such a problem is that during preparation of an original manual by an aircraft manufacturer, a stress is posed on the technical information and specification of respective components (parts), paying no attention on the relationship between those components or on the roles of the components for the entire aircraft. That is, the technical information is given in fragments.

Although a manual prepared by an aircraft manufacturing company also contains three-dimensional view drawings including showing an entire aircraft configuration, these drawings are drawn considering the aircraft simply as an inorganic structure. They simply express the configuration of the aircraft and arrangements of components strictly from the physical viewpoint and a maintenance engineer cannot know functional relationships between them.

Moreover, the drawings are so much detailed that lines drawn are overlaid and respective components appear in a small size scale because they are drawn according to the scale of the entire aircraft. This makes it difficult to understand the relationships between the components and to know detailed structures.

Conventionally, these problems of the maintenance manual have been coped with by experience and efforts of maintenance engineers.

That is, although it is difficult to read a three-dimensional view drawing of an entire aircraft, maintenance engineers who have actually experienced maintenance works many times manage to understand the relationships between the drawing and the actual aircraft and finally can estimate a work to be performed based on the three-dimensional drawing of the entire aircraft.

As for the respective components (parts), through work experiences, engineers can accumulate a knowledge of functions of the respective components and connections and functional relationships between these components.

On the other hand, the performance and the durability of an aircraft have been significantly improved and the frequency of occurrence of a failure in the aircraft is significantly decreased as compared to an aircraft of the prior art.

This leads to a sharp decrease in the number of times to actually experience maintenance works and it is becoming difficult for young engineers to learn functions and structures of an aircraft on the maintenance site.

This results in that only those engineers having a sufficient experience can actually know the structures and functions of the aircraft, leaving an anxiety for the future maintenance system.

Moreover, even those engineers having a rich experience cannot have a complete knowledge of contents of numerous pages of a parts catalogue including parts ID numbers. Retrieval of a parts catalogue and ID numbers requires a plenty of time regardless of experience. This problem cannot be solved by the efforts and experience of the engineers.

SUMMARY OF THE INVENTION

It is therefore an object of the present invention to provide a maintenance manual interface system enabling even young engineers having little experience to easily perform a maintenance work of a machine composed of numerous components and having highly sophisticated functions such as an aircraft and other transportation means as well as to easily retrieve a parts catalogue.

Another object of the present invention is to provide a medium containing a computer program product for the maintenance manual interface system.

The maintenance manual interface system according to the present invention is to be used for retrieving and identifying a paragraph of a maintenance manual to be referenced in response to a maintenance request information. The interface system comprises: a nonvolatile storage unit including: a total management storage block containing an image data of total management drawings, each showing a set of structurally related components which set is specified by the maintenance request information; a partial management storage block containing an image data of partial management drawings corresponding to the respective components of the set; a detailed information storage block containing a detailed information associated with the respective components of the set; and a manual information storage block containing paragraphs of the maintenance manual stored corresponding to the respective components;

a display screen for displaying an information;

a main controller for data processing; and a man-machine interface having a function for entering a maintenance request information, a detailed information display request, and a maintenance manual display request into the main controller and a function for specifying a position on the display screen.

Moreover, the main controller includes: a total management storage display controller for detecting a maintenance request information entered through the man-machine interface, reading out a total management drawing corresponding to the maintenance request information from the total management storage block, and displaying the total management drawing on the display screen; a partial management storage display controller for detecting a position specification on the currently displayed drawing through the man-machine interface, reading out a partial management drawing corresponding to a component specified by the position specification, from the partial management storage block, and displaying the partial management drawing on the display screen; a detailed information display controller for detecting a detailed information display request from the man-machine interface, reading out a detailed information associated with the currently displayed partial management drawing, from the detailed information storage block, and displaying the detailed information on the display screen; and a manual information display controller for detecting a manual information display request from the man-machine interface, reading out a paragraph of the maintenance manual associated with the currently displayed detailed drawing, and displaying the paragraph on the display screen.

Firstly, an operator enters a maintenance request information into the controller through the man-machine interface. Upon detection of this maintenance request information entered, the total management display controller of the main controller reads out a total management drawing of a set of components possibly causing an error, from the total management storage block of the nonvolatile storage unit and displays the total management drawing on the display screen.

Since only the set of components structurally related is displayed, it is easy to understand functional relationships between the components. That is, no excessive lines are involved to complicate the drawing and an operator can easily understand an entire configuration of set and locations of the respective components.

Here, the operator can specify a position on the display screen using the man-machine interface. Upon detection of this position specification, the partial management display controller of the main controller reads out a partial management drawing corresponding to the component specified by the position specification, from the partial management storage block and displays the partial management drawing on the display screen. Thus, the operator can easily check details of the component possibly causing the error.

Furthermore, if the operator wants to know a detailed information of this component, the operator enters a detailed information display request to the detailed information display controller of the main controller by operating the man-machine interface. Upon detection of this detailed information display request, the detailed information display controller reads out from a detailed information associated with the currently displayed component, from the detailed information storage block of the nonvolatile storage unit and displays the detailed information on the display screen.

This detailed information storage block can contain explanations on functions and remarks as a text information and operation states of movable components as an animation file and an image file. For example, the detailed information may be drawings and sentences explaining functions, perspective and other views of the components, drawings and sentences indicating a decision criterion required for a maintenance work of the component, and any other information considered to be necessary by a designer of this maintenance manual interface system. The operator operating this maintenance manual interface system can reference this detailed information to deepen his understanding on the components.

When the operator wants to reference a paragraph (page) of the maintenance manual associated with a currently displayed component, he can operate the man-machine interface to enter a manual information display request to the manual information display controller of the main controller. Upon detection of the manual information display request, the detailed information display controller reads out a maintenance manual information associated with the currently displayed component, from the manual information storage block of the nonvolatile storage unit and displays the maintenance manual information on the display screen.

A maintenance work, finally, should be performed according to a specification and information given in an authorized maintenance manual. With the help of the aforementioned total management display controller, the partial management display controller, and the manual information display controller, even an operator having little experience, by using the maintenance request information, can find a page of the maintenance manual required for an actual maintenance work in a short time. Furthermore, contents of a parts catalogue can be stored in the manual information storage block or in the detailed information storage block so as to correspond to respective components. Accordingly, the operator can rapidly retrieve a parts catalogue and a parts number.

Moreover, the detailed information storage block of the nonvolatile memory can contain an additional information for the authorized maintenance manual. This further helps the operator effectively perform the maintenance work.

Moreover, a program-recorded medium according to the present invention contains a computer program product for implementing through a computer a maintenance manual interface system for retrieving and specifying a paragraph of a maintenance manual to be referenced according to a maintenance request information. The program-recorded medium contains: a total management storage file containing an image data of total management drawings, each showing a set of structurally related components which set is specified by the maintenance request information; a partial management storage file containing an image data of partial management drawings corresponding to the respective components; a detailed information storage file containing a detailed information associated with the respective components; a manual information storage file containing paragraphs of the maintenance manual stored corresponding to the respective components; an operator operation detection computer program product for recognizing an operation by an operator on a man-machine interface provided in the computer and detecting a maintenance request information, a detailed information display request, and a maintenance manual display request which have been entered as well as a position of a position specification performed on a display screen provided in the computer; a total management storage display program activated upon detection of an entry of a maintenance request information by the operator operation detection program, for reading out a total management drawing corresponding to the maintenance request information from the total management storage file and displaying the total management drawing on the display screen; a partial management storage display program activated upon detection of a position specification on a currently displayed total management drawing by the operator operation detection program, for reading out a partial management drawing corresponding to a component specified by the position specification, from the partial management storage file and displaying the partial management drawing on the display screen; a detailed information display program activated upon detection of an entry of a detailed information display request by the operator operation detection program, for reading out a detailed information associated with the currently displayed partial management drawing, from the detailed information storage file and displaying the detailed information on the display screen; a manual information display program activated upon detection of an entry of a manual information display request by the operator operation detection program, for reading out a paragraph of the maintenance manual associated with the currently displayed detailed drawing and displaying the paragraph on the display screen; and an installation program for installing the total management storage file, the partial management storage file, the detailed information storage file, and the manual information storage file into the computer.

BRIEF DESCRIPTION OF THE DRAWINGS

FIG. 9 shows an initial screen image including the ATA chapter number and the table of contents where chapter 36 is specified by click operation as an example.

FIG. 10 shows the initial screen image where chapter number 36 is displayed in boldface.

FIG. 17 shows an example of a page of a manual (basic document).

DESCRIPTION OF THE PREFERRED EMBODIMENT

Description will now be directed to an embodiment of the maintenance manual interface system according to the present invention applied to an aircraft with reference to the attached drawings.

Figure 1:
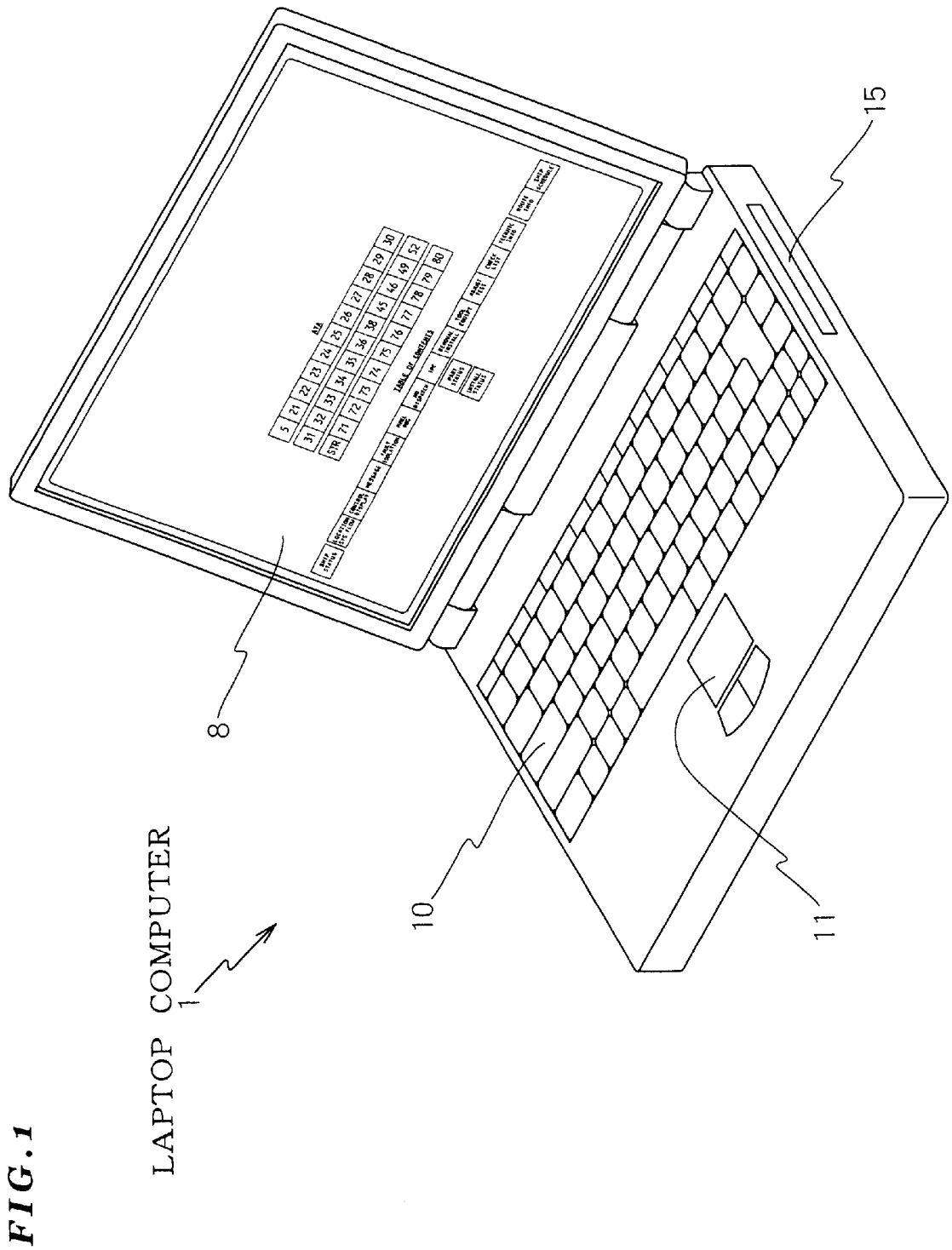
FIG. 1 is a simplified perspective view of a laptop computer as a maintenance manual interface system.
Figure 2:
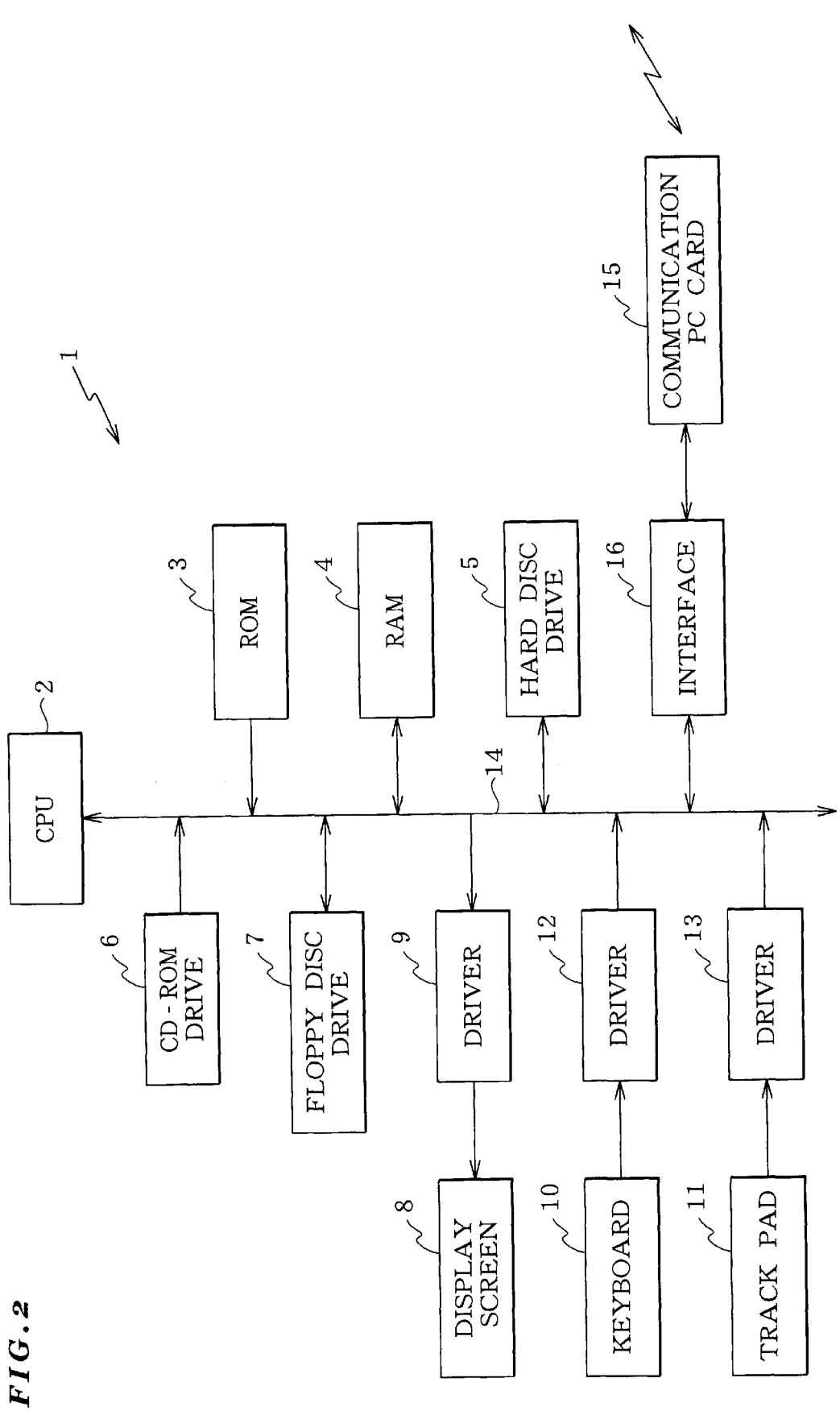
FIG. 2 is a simplified block diagram showing an internal configuration of the laptop computer.

FIG. 1 is a perspective external view of a laptop computer 1 as the maintenance manual interface system, and FIG. 2 is a block diagram showing a simplified internal configuration of the laptop computer 1.

In this embodiment, the laptop computer 1 constitutes the maintenance manual interface system for facilitating maintenance work in a maintenance site but the laptop computer 1 may also be replaced by a desktop computer or a workstation available on market and may be dedicated to the maintenance work.

The laptop computer 1 includes a CPU 2 constituting a main control block, a ROM 3 containing a start program, a RAM 4 for computing processes, and a hard disc drive 5 as a nonvolatile storage unit containing an operation system and the like. A CD-ROM drive 6 and a floppy disc drive 7 function as auxiliary storage devices. A display screen 8 for displaying an information is driven and controlled by the CPU 2 via a driver 9.

A keyboard 10 and a track pad 11 constitute a part of the man-machine interface and they are connected to a bus 13 of the CPU 2 via drivers 12 and 13, respectively. A communication PC card (PCM/CIA card) 15 is connected to the bus 14 via an interface 16, so as to enable communication between the CPU 2 and an external apparatus such as another workstation.

Moreover, the hard disc drive 5 contains, in addition to the aforementioned operation system, necessary files including a total management file, a partial management file, a detailed information file, and a manual information file, as well as application programs including an operator operation detection program, a total management display program, a partial management display program, a detailed information display program, and a manual information display program. These files and programs are installed from a magnetic recording medium such as a CD-ROM to the hard disc drive 5 as a nonvolatile recording unit by an installation program provided in the magnetic recording medium itself.

The hard disc drive 5 has a storage region divided into a total management storage block containing the total management file, a partial management storage block containing the partial management file, a detailed information storage block containing the detailed information file, and a manual information storage block containing the manual information file.

Moreover, the operator operation detection program, the total management display program, the partial management display program, the detailed information display program, and the manual information display program are read out from the hard disc drive 5 onto the RAM 4 by the CPU 2 under control of the operation system, and they are successively executed by the CPU 2. That is, the CPU 2 executing the total management display program serves as a total management display controller, the CPU 2 executing the partial management display program serves as a partial management display controller, the CPU 2 executing the detailed information display program serves as a detailed information display controller, and the CPU 2 executing the manual information display program serves as a manual information display controller.

While these programs are executed, the operator operation detection program constituting a part of means for realizing the man-machine interface function together with the keyboard 10 and the track pad 11 are concurrently executed. The operator operation detection program interprets an instruction entered by an operator via the man-machine interface including the keyboard 10 and the track pad 11, and passes the instruction to the aforementioned programs.

This interpretation work includes an identification work for identifying the operation of the keyboard 10 and the track pad 11 as the input of a maintenance request information, a detailed information display request, a maintenance manual display request, or a display state specification request, as well as a correspondence work for reading a position of the cursor moving over the display screen 8 according to operation of the track pad 11 by the operator so as to specify a correspondence between the cursor position and a diagram/drawing currently displayed on the display screen 8.

Figure 3:
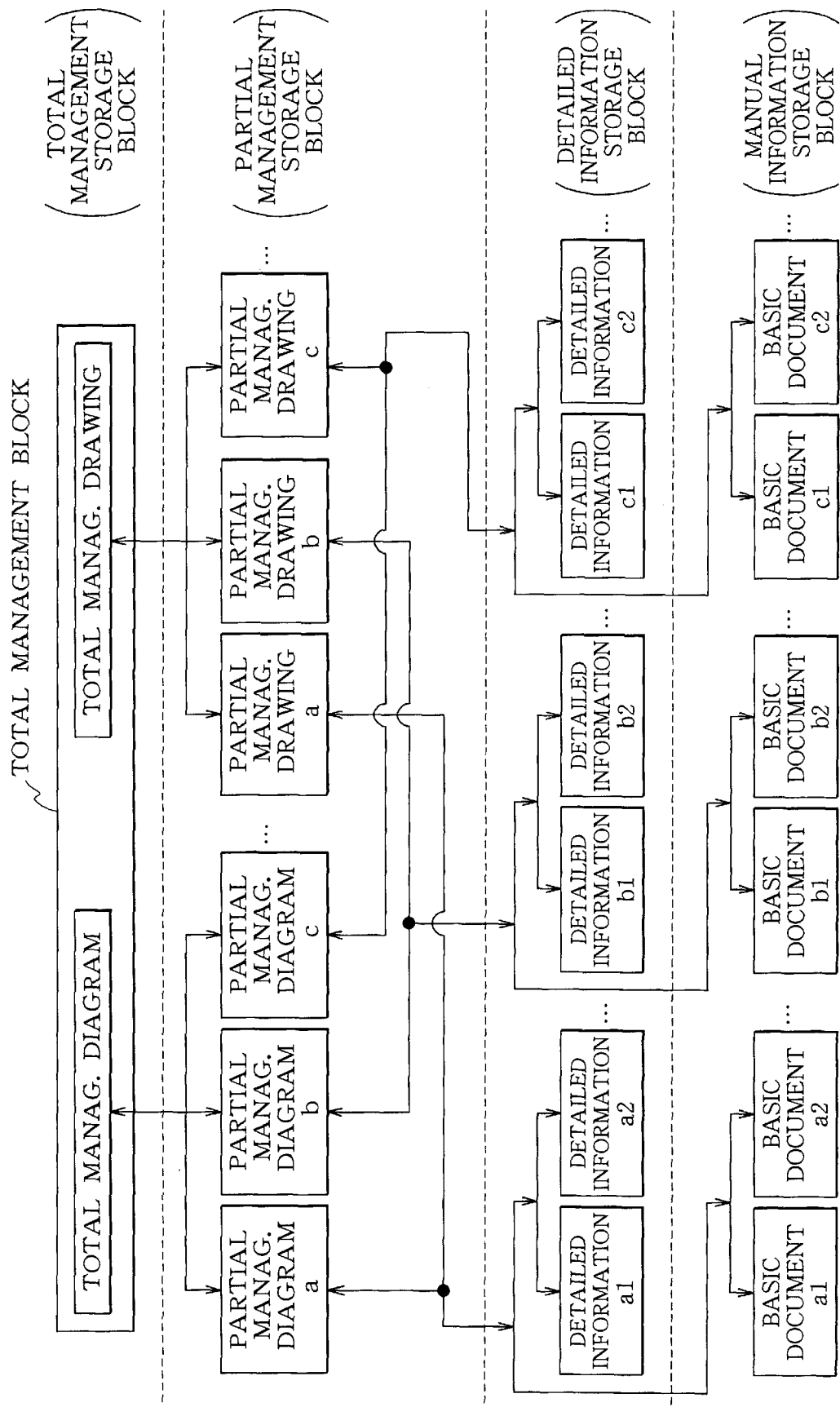
FIG. 3 is a simplified conceptual view showing interrelationships between files stored in a nonvolatile storage unit of the maintenance manual interface system.
Figure 4:
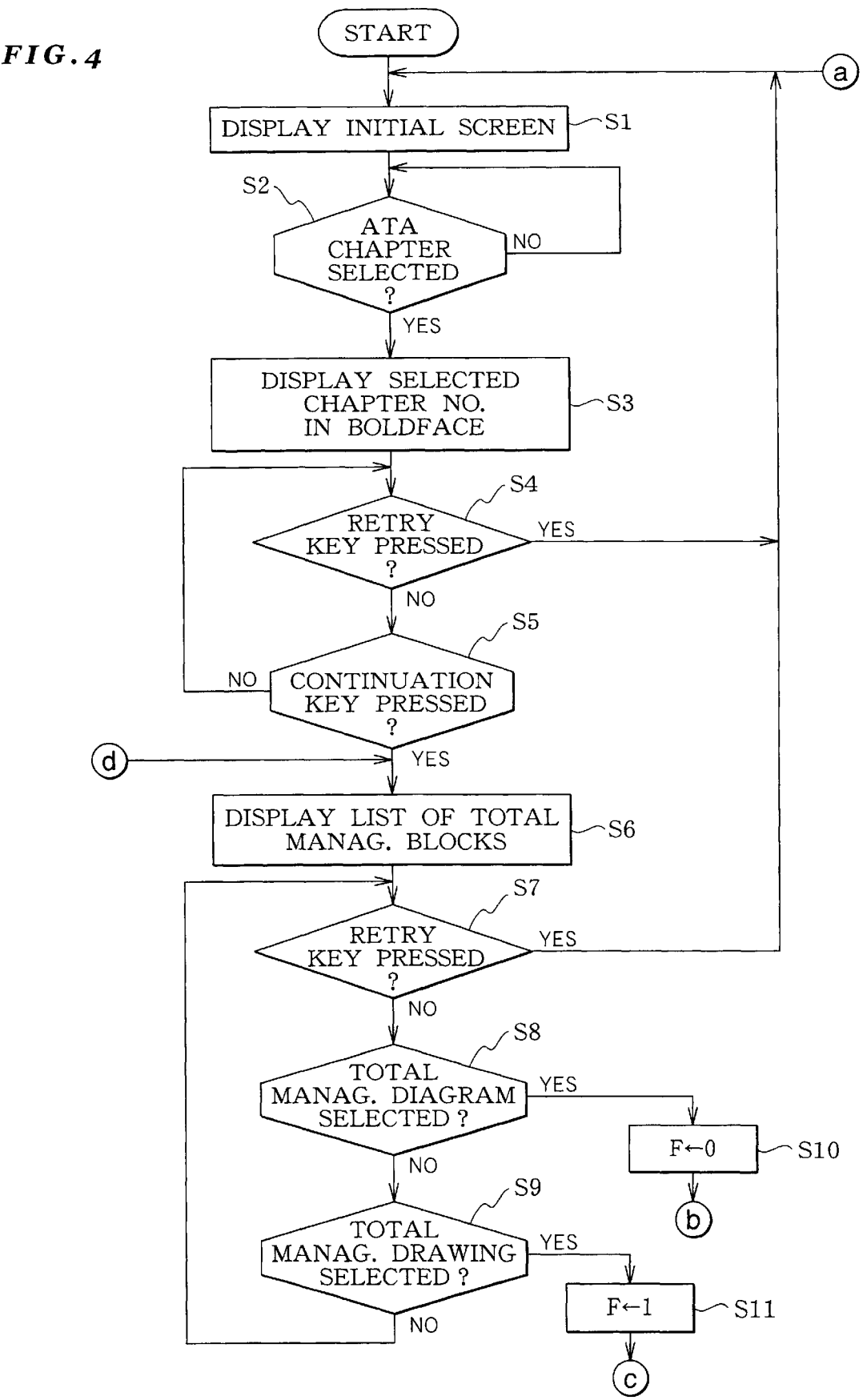
FIG. 4 is a flowchart showing processes performed by a CPU of the maintenance manual interface system.
Figure 5:
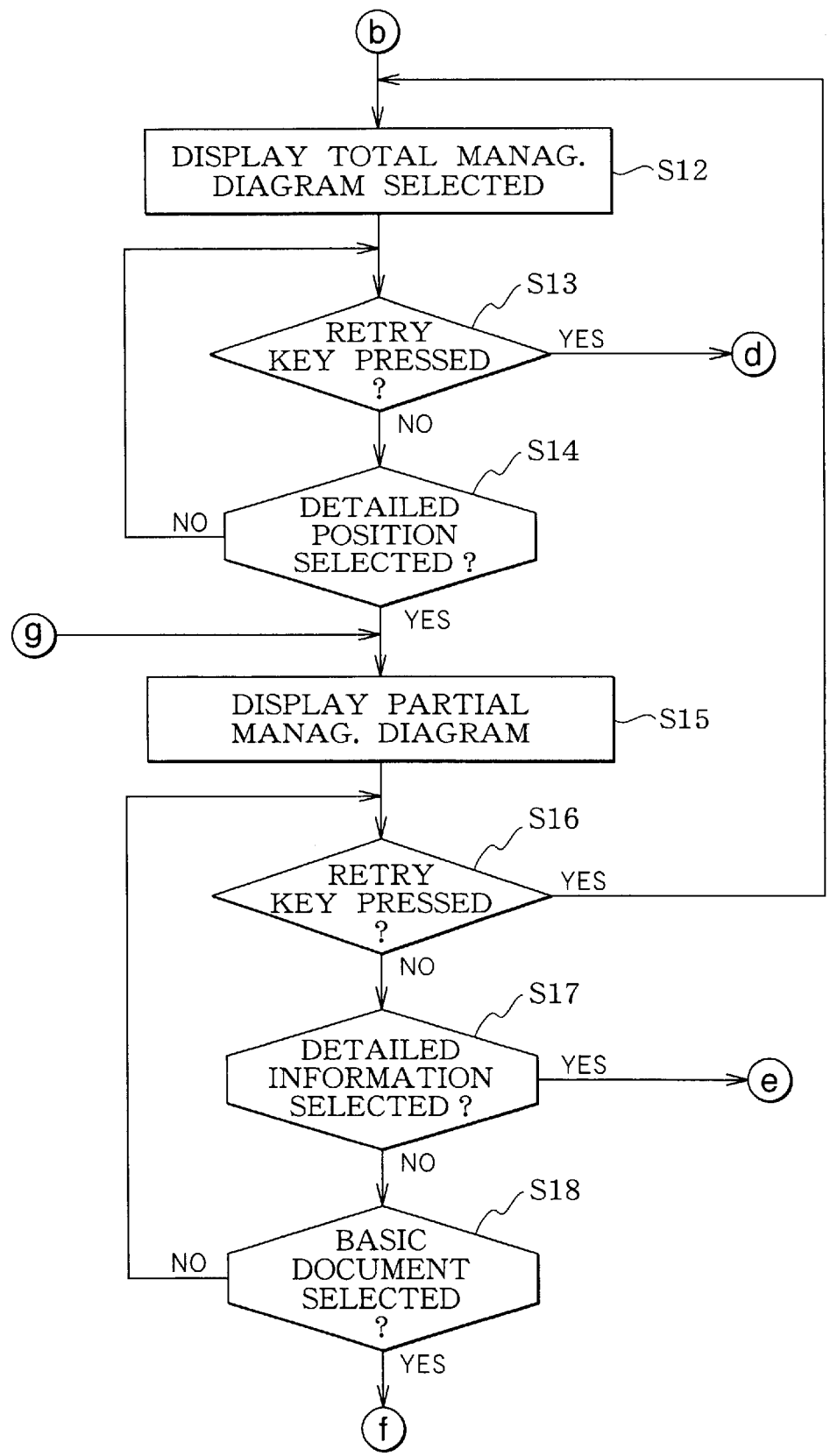
FIG. 5 is a continuation of the flowchart of FIG. 4.

FIG. 3 is a simplified conceptual view of the interrelationships between the files stored in the hard disc drive 5 as the nonvolatile storage unit. As shown in FIG. 3, in the hard disc drive 5, the total management storage block contains: a three-dimensional image data constituting a total management drawing, i.e., an entire configuration (shape) of a set of structurally associated components corresponding to a maintenance request information associated with a particular type of aircraft subjected to maintenance; and a two-dimensional image data constituting a total management diagram (functional block diagram) showing electrical and mechanical connections between the components of the set.

Description of an aircraft system configuration is usually divided into about 100 chapters as defined by the Air Transport Association of America (hereinafter, referred to as ATA) such as Pneumatic Air System (Chapter 36), Air Condition System (Chapter 21), and Electric System (Chapter 24).

Figure 18:
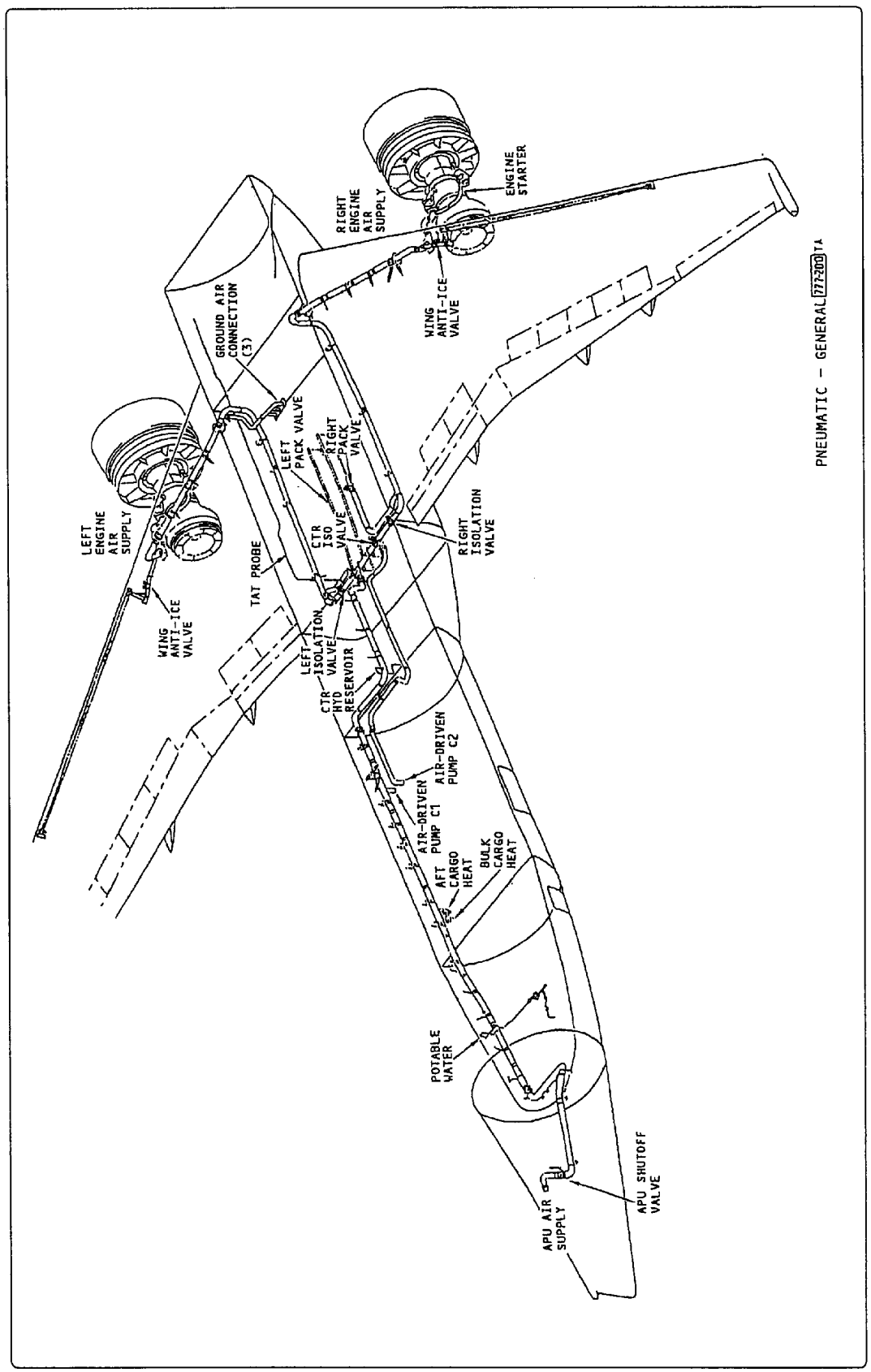
FIG. 18 shows an example of a total management drawing.

Here, explanation will be given on the Pneumatic Air System as an example with reference to FIG. 13 and FIG. 18. FIG. 18 represents a total management drawing in three-dimensional view showing an air flow from each of the right and left engines as air supply sources, an air flow from an auxiliary power unit, locations where the air is used, and relationships between the locations (direction of the air flow). Moreover, FIG. 13 represents a total management diagram showing an air flow from each of the right and left engines as the air supply sources, an air flow from the auxiliary power unit locations where the air is used, and relationships between the locations (direction of the air flow), as well as relationships between control switches and valves operated by the control switches.

For each of the other chapters, the total management storage block contains at least one of a total management drawing and a total management diagram with the same technical concept for systematizing the image data.

It should be noted that the three-dimensional data may be a vector data or a raster data capable of expressing a three-dimensional image on the display screen 8. Accordingly, a perspective view saved substantially as a two-dimensional vector data or raster data is also included in the three-dimensional data.

Figure 13:
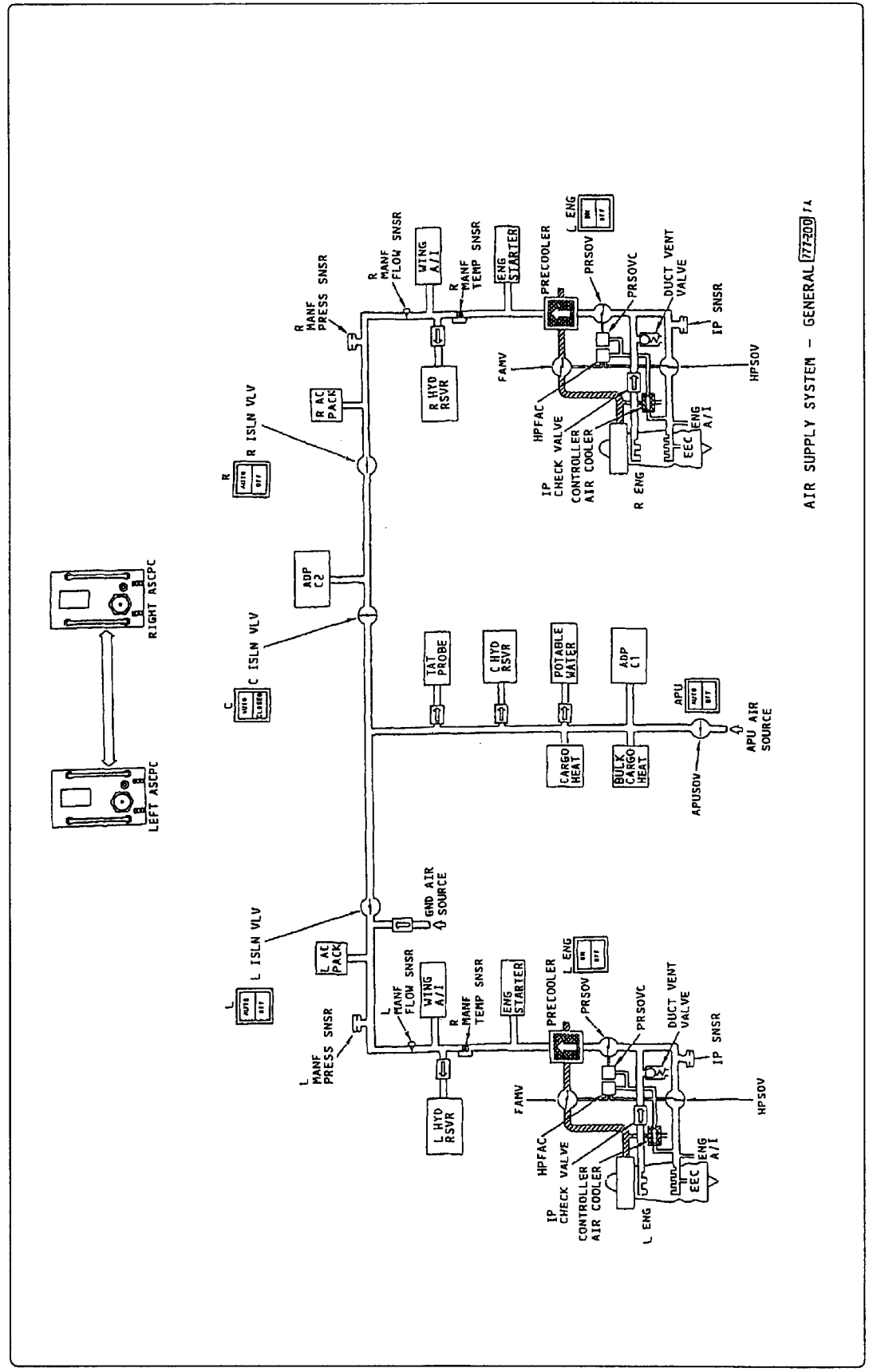
FIG. 13 shows an example of a total management diagram.

Moreover, the partial management storage block of the hard disc drive 5 shown in FIG. 3 contains as image data: detailed drawings of the respective components of each set as an entire configuration shown in the total management drawing (such as FIG. 18); and detailed diagrams showing electrical and mechanical structures of the respective components shown in the total management diagram (such as FIG. 13).

Figure 14:
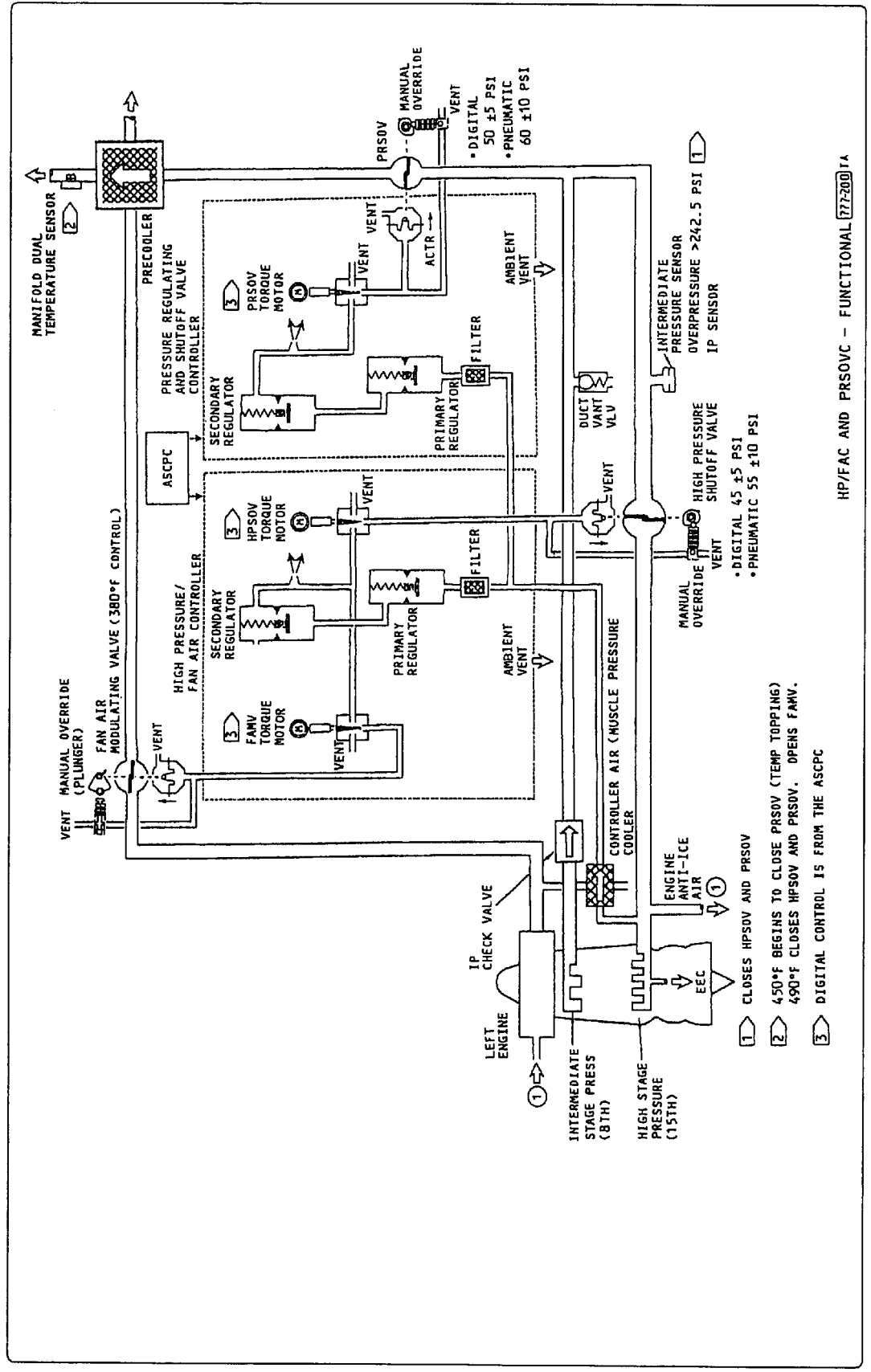
FIG. 14 shows an example of a partial management drawing.
Figure 19:
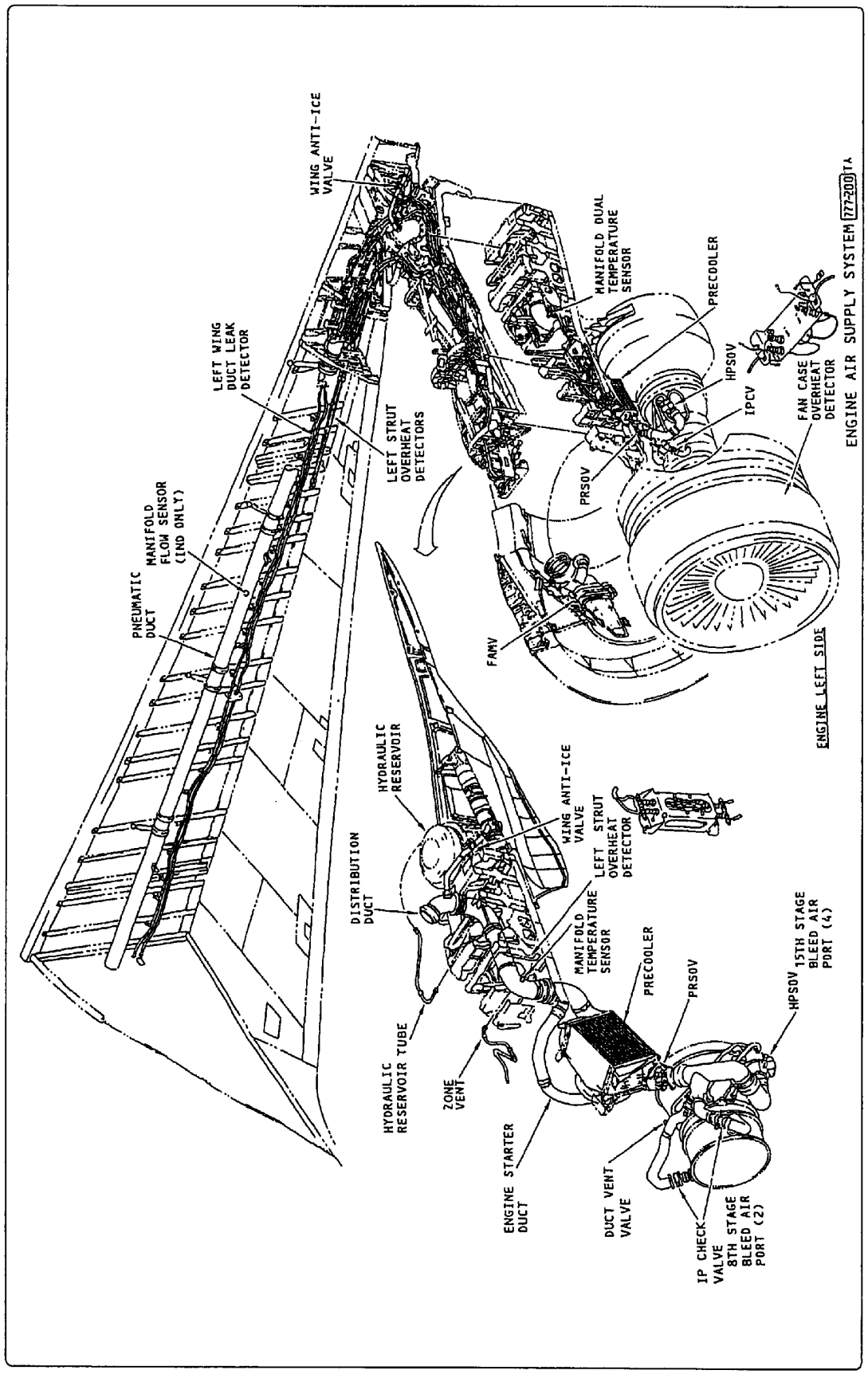
FIG. 19 shows an example of a partial management drawing.

As an example, FIG. 19 shows a detailed drawing associated with the total management drawing of FIG. 18, and FIG. 14 shows a detailed diagram associated with the total management diagram of FIG. 13. The detailed drawing of FIG. 19 shows a portion of the aircraft from the engine to the wing including an air flow from the engine and components involved. Moreover, the detailed diagram of FIG. 14 shows an air from the engine and components involved as well as functional relationships between them.

As shown in FIG. 3, a plurality of partial management drawings exist corresponding to respective components of a total management drawing, and a plurality of partial management diagrams exist corresponding to respective components of a total management diagram.

Furthermore, the detailed information storage block of the hard disc drive 5 shown in FIG. 3 contains information associated with the components shown in the aforementioned partial management drawing (such as FIG. 19) and the partial management diagram (such as FIG. 14) as a detailed information consisting of an image file or text file or animation file. The animation file is preferable for showing an operation state of a movable component. The detailed information may contain a drawing and a sentence for explaining a function, perspective and plan views of the component for easy observation, a drawing and a sentence indicating a decision criterion required for maintenance of the component, and any other information considered to be necessary. The detailed information gives an additional information to the maintenance manual information, so as to help engineers having little experience easily grasp the situation, and is not necessarily restricted to the specification of the maintenance manual.

Figure 15:
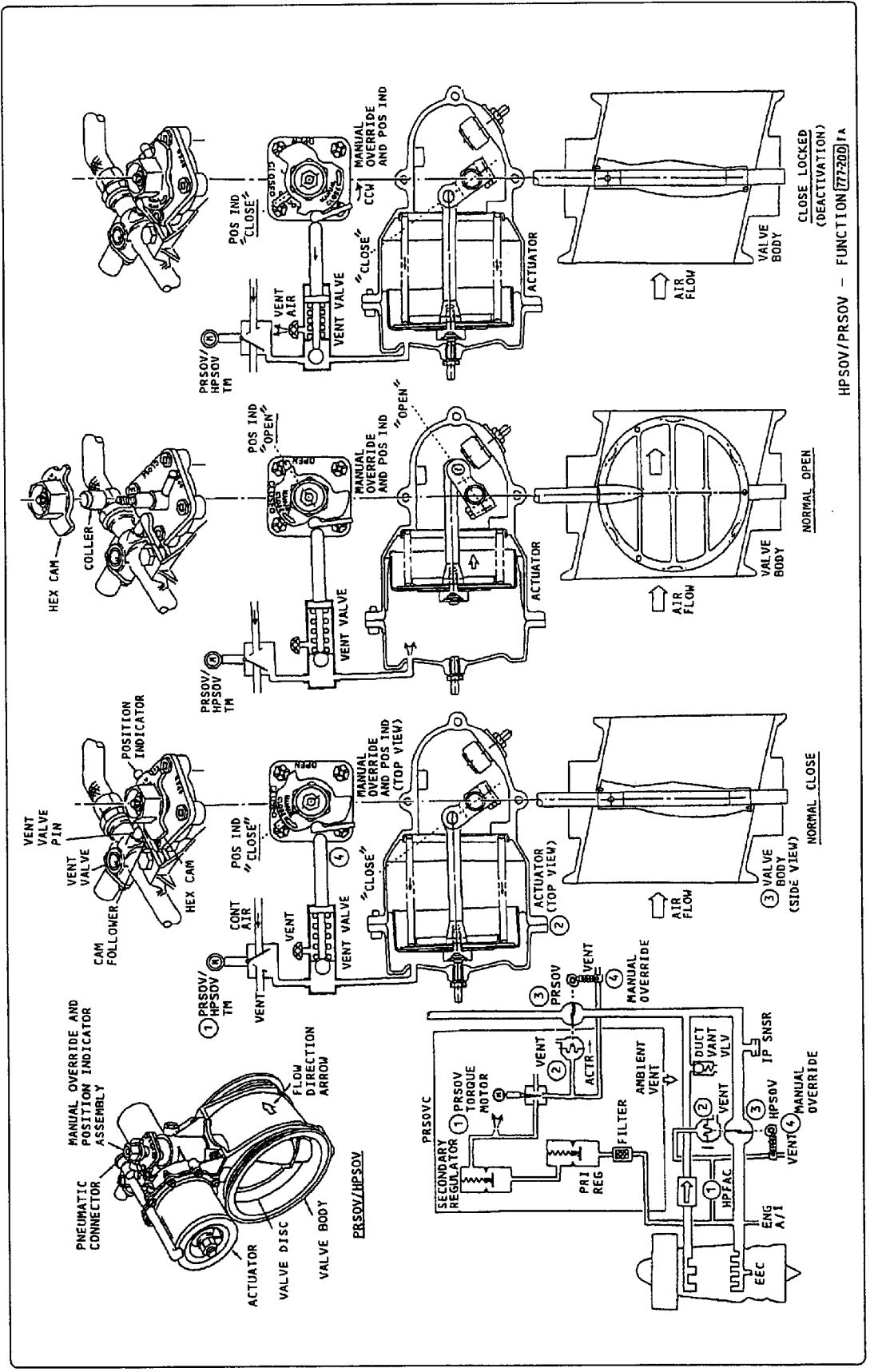
FIG. 15 shows an example of a detailed information.
Figure 16:
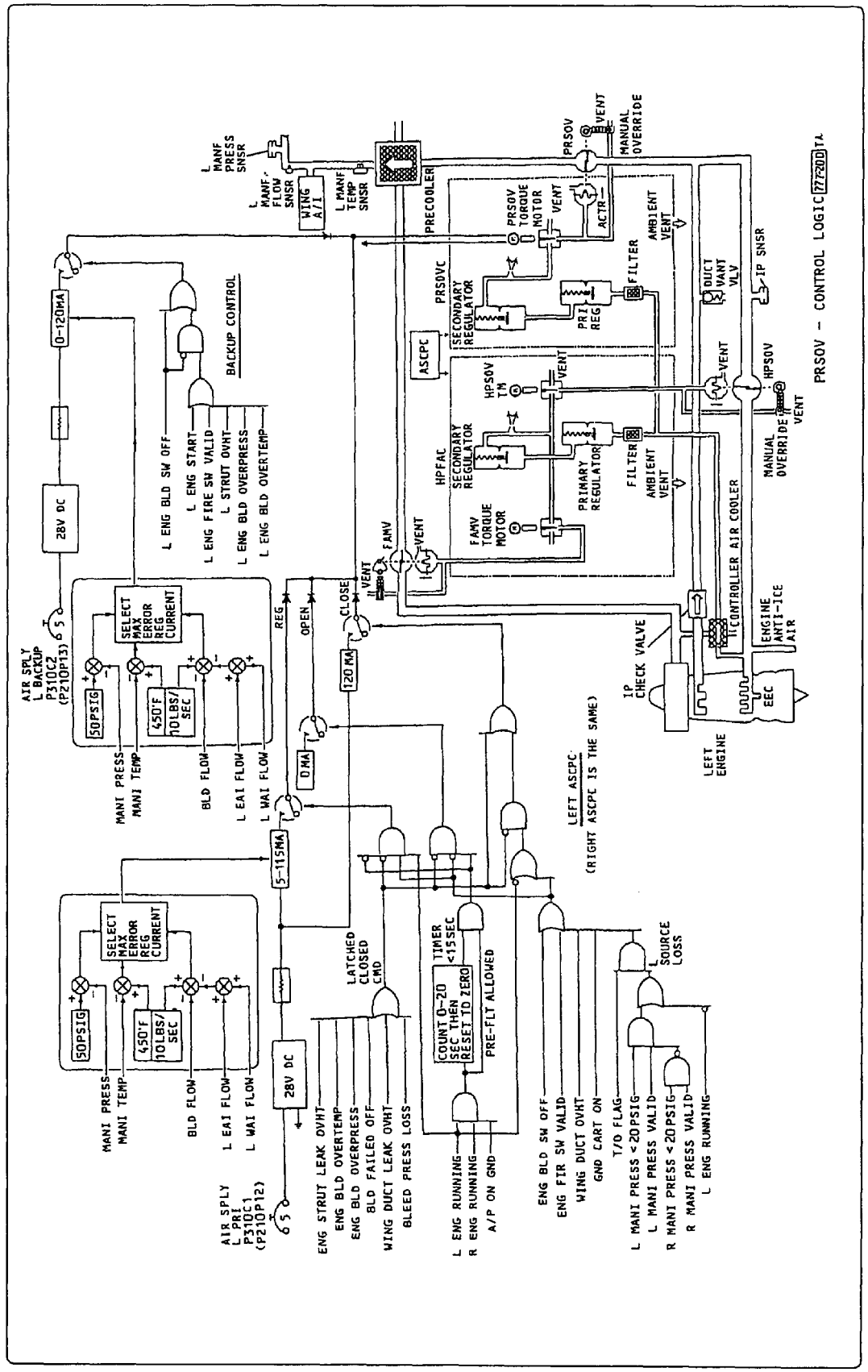
FIG. 16 shows another example of a detailed information.

FIG. 15 and FIG. 16 show some examples of the detailed information associated with the partial management drawing of FIG. 19 and the partial management diagram of FIG. 14. FIG. 15 shows a detailed information on a pressure regulating and shutoff valve as a component of the engine and indicates a specific operation and function of the valve. Moreover, FIG. 16 is a block diagram showing a detailed information on the pressure regulating and shutoff valve as the component of the engine, including the valve operation condition and the electric operation system.

The detailed information for each component may include a plurality of diagrams/drawings.

Moreover, the manual information storage block of the hard disc drive 5 contains as an image file or text file the contents of a maintenance manual (hereinafter, referred to as a basic document) associated with the component shown in the partial management drawing (such as FIG. 19) and the partial management diagram (such as FIG. 14). FIG. 17 shows an example of the basic document associated with the partial management drawing of FIG. 19 and the partial management diagram of FIG. 14. The basic document of FIG. 17 represents an information contained in a manual for the pressure regulating and shutoff valve issued by an aircraft manufacturing company. The basic document may contain a plurality of pages. It should be noted that the basic document is an operation manual prepared by an aircraft manufacturing company which may have been corrected by an aviation company so as to satisfy conditions to be an official manual and is not allowed to be modified.

Next, a detailed explanation will be given on the operation of the maintenance manual interface system of the present embodiment with reference to a flowchart shown in FIG. 4 to FIG. 8 showing an outline of processes executed by the CPU 2 constituting the main control block of the maintenance manual interface system.

When the power switch of the maintenance manual interface system composed of the laptop computer 1 is turned on to activate the operator operation detection program, the CPU 2 firstly shows a list of ATA chapter numbers together with a table of contents as an initial screen image as shown in FIG. 9 (step s1) and enters a wait state. The operator (maintenance engineer) selects one of the ATA chapter numbers via the man-machine interface including the keyboard and the track pad 11. As has been described above, description of an aircraft system configuration is roughly divided into ATA chapters.

An error detector arranged in a cockpit of an aircraft can output a simple maintenance request message including an error detection information. This message contains a fault code and a maintenance code which can be used to identify an ATA chapter number associated with the error. Moreover, the error detection information is promptly transmitted to a control tower via a radio channel and the laptop computer 1 can receive an information associated with the error detection from a workstation of the control tower.

Here, when a maintenance engineer as an operator selects, for example, "36" as the ATA chapter number by entering a numeric through keyboard operation or click on the display screen 8 using the track pad 11 (see FIG. 9), the CPU 2 detects this operation in the decision process of step s2 and displays the number "36" in boldface as shown in FIG. 10 (step s3) and enters a wait state.

The operator can press a "retry" key (step s4) or a "continuation" key (step s5). These keys are function keys allocated on alphabet keys on the keyboard.

When the operator has specified an ATA chapter incorrectly, he/she can press the retry key to respecify an ATA chapter on the table of contents. When a correct ATA chapter has been specified, the operator presses the continuation key to proceed to the next step.

It should be noted that the table of contents shown in FIG. 10 shows a list of titles of the total management blocks associated with chapter 36. For example, "MMEC" is an abbreviation of Master Minimum Equipment Catalogue, which is a basic list of a minimum system required for starting an aircraft. Moreover, the "DDG" is an abbreviation of Dispatch Deviations Guide, a guide to as countermeasure when an error is involved in the minimum system required for starting an aircraft.

When the continuation key is pressed by the operator, the CPU 2 displays on the display screen 8 a list of the total management blocks associated with the selected chapter, i.e., chapter 36 in this case (step s6) and enters a wait state. The operator presses the retry key or selects a total management drawing or diagram (steps s7 to s9). At this stage also, it is possible to press the retry key to return to the initial screen image so as to re-select an ATA chapter.

Figure 11:
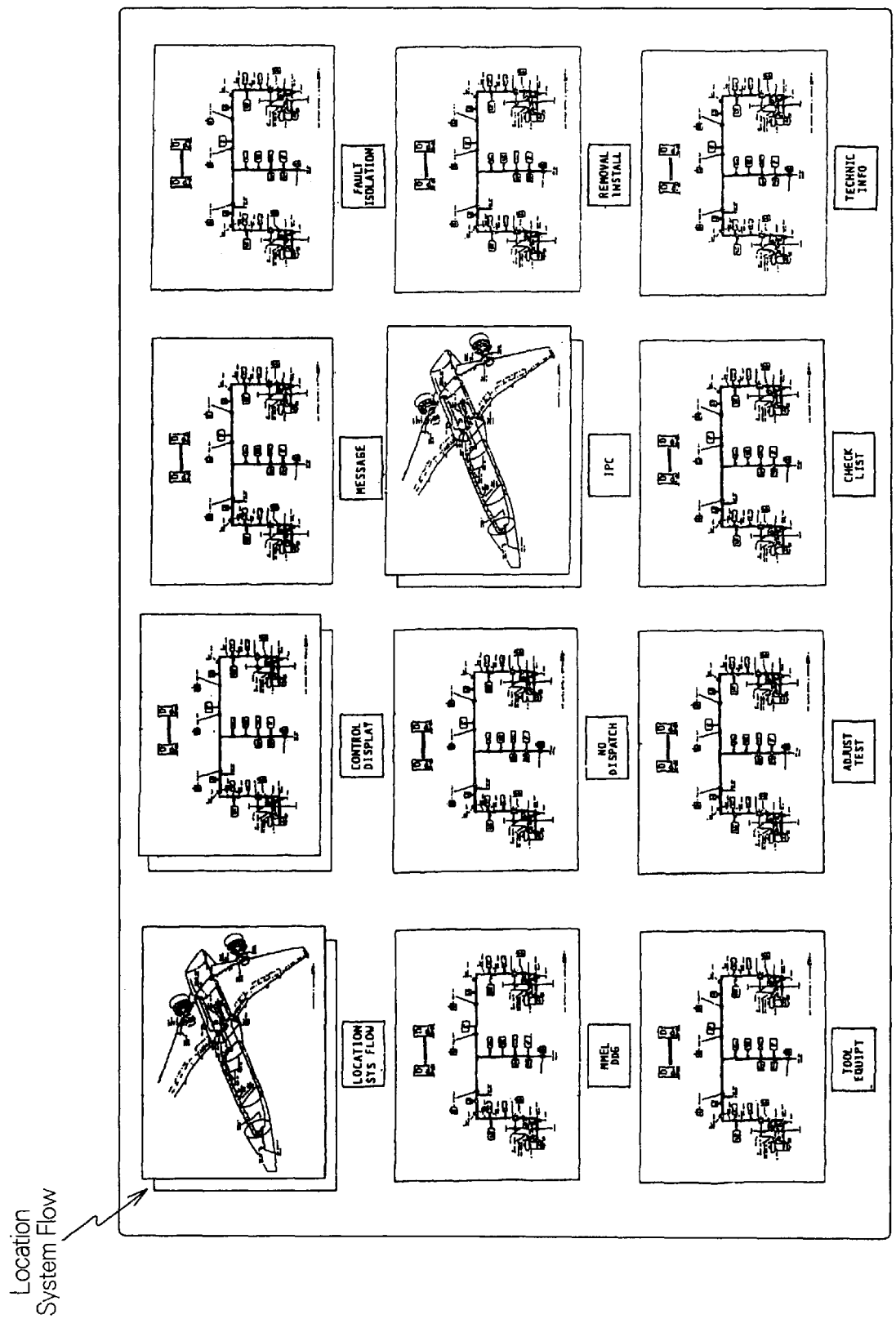
FIG. 11 shows a list of total management blocks that can be displayed on the screen.

FIG. 11 shows a list of the total management blocks associated with ATA chapter 36 including a total management block of the Location System Flow of the Pneumatic Air System and a total management block of Control Display indicating the power supply and wiring of the Pneumatic air System.

Each of the total management blocks may consist of a three-dimensional drawing alone, a block diagram alone, or both of a three-dimensional drawing and a block diagram.

Hereinafter, explanation will be given on a case when the Location System Flow shown at the upper left of FIG. 11 is selected. Moreover, the abbreviations used are well known to those skilled in art. Some of the abbreviations are shown in full spellings in Table 1 for convenience.

Table 1

Figure 12:
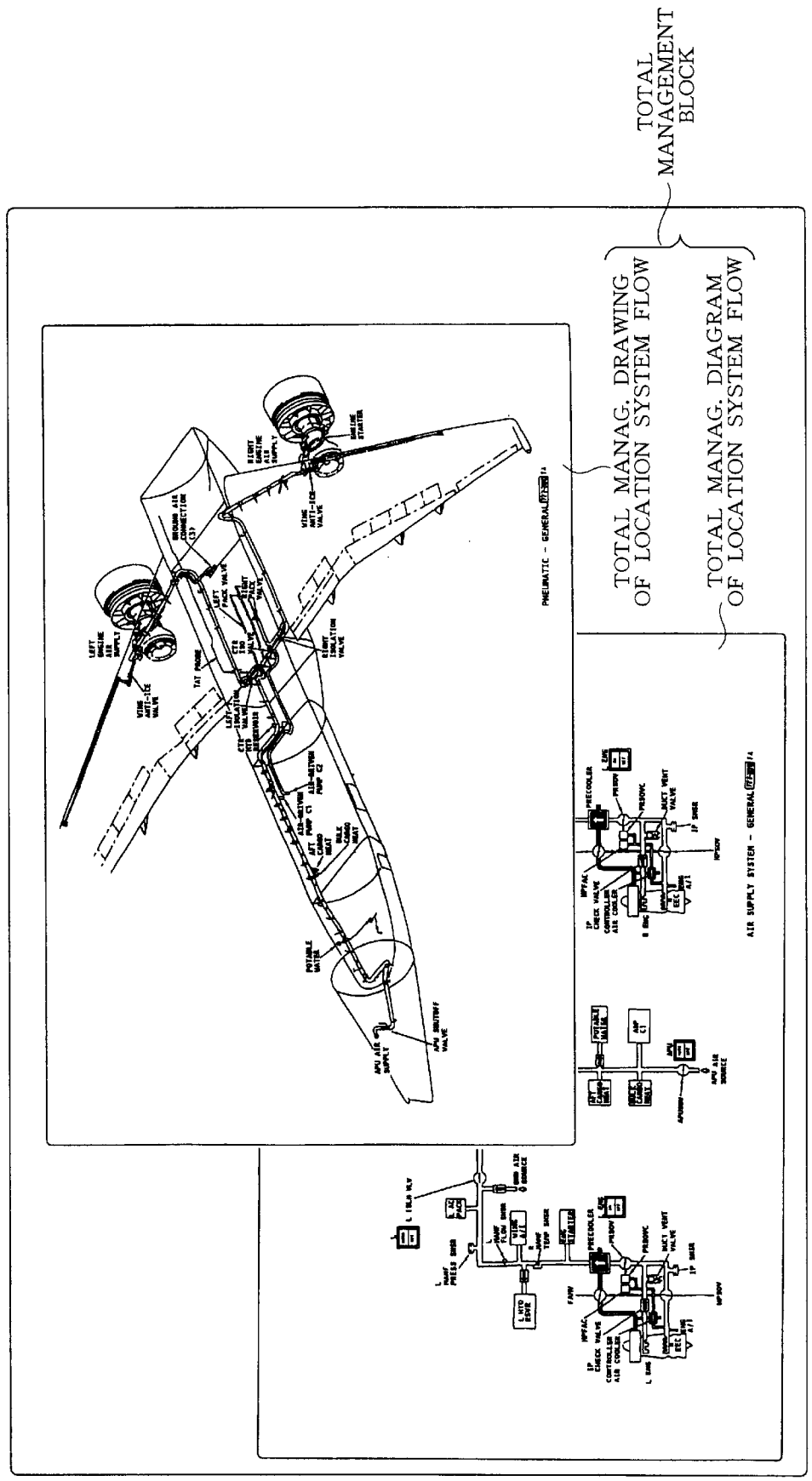
FIG. 12 shows an example of a total management block consisting of a total management drawing and a total management diagram.

Firstly, for example, the operator selects the total management diagram of the Location System Flow (FIG. 12) by moving the cursor on the display screen 8 and performing the position specification operation. The CPU 2 detects this operation in the decision process of step s8 and sets 0 in flag F to indicate that the total management diagram is being displayed step s10).

Next, the CPU 2 as the total management block display controller reads the total management diagram corresponding to the Location System Flow of the Pneumatic Air System (ATA chapter 36) from the total management storage block of the hard disc drive 5 as the nonvolatile storage means and displays the diagram on the display screen 8 as shown in FIG. 13 (step s12) and enters a wait state. The operator may press the retry key or selects a partial management block by moving the cursor to the partial management block on the diagram displayed (steps s13 to s14).

This total management diagram, as shown in FIG. 13, clearly shows the air flow from the right and the left engines as air supply sources, air flow from the auxiliary power unit, and locations where the air is used, as well as interrelationships between these locations, without involving complicated mechanical components or electric wiring and linkage which are not directly associated with the air flows, i.e., components which have little relations for the system configuration. Accordingly, even those engineers having little experience can easily understand the configuration of the pneumatic air system including the relationships between the components of the system.

Furthermore, since only those components associated with the pneumatic air system are displayed, lines in the diagram are not complicated and component involved can be displayed at a sufficient interval. This facilitates to select a component which the operator wants to know more about.

It should be noted that when the operator has specified a wrong component, the operator can operate the retry key to return to the process of step s6, where the list of the total management blocks is displayed as shown in FIG. 11.

The operator can select a component he wants to know more about by operating the track pad 11 to move the cursor to that component and performing a click operation. The CPU 2 as the partial management display controller detects this operation in the decision process of step s14 and reads a diagram of the component specified by the click so as to display the diagram on the display screen 8 as shown in FIG. 14 (step s15). Then, the CPU 2 enters a wait status. The operator can operate the retry key or enter a detailed information display request or maintenance manual display request (steps s16 to s18).

When the operator clicks the left engine or the vicinity of the left engine on the total management diagram as shown in FIG. 13, a detailed diagram of the left engine appears as shown in FIG. 14.

It should be noted that when the operator has selected a wrong component, the operator can operates the retry key to return to the process of step s12 so as to display the total management diagram as shown in FIG. 13, where the operator can select a component again.

When the operator operates the keyboard 10 or the track pad 11 to enter a detailed information display request while the diagram of FIG. 14 is displayed, the CPU 2 as the detailed information display controller detects this operation in the decision process of step s17 and initializes a retrieval index i value to 1 (step s19) and reads a data of the i-th page of the detailed information associated with the component (left engine in this case) currently displayed on the display screen 8 so as to display the data on the display screen 8 as shown in FIG. 15 (step s20). Then, the CPU enters a wait state. The operator can operate the retry key or the continuation key (steps s21 and s22).

FIG. 15 shows an example of the open/close operation of the pressure regulating and shutoff valve in the pneumatic air system of the left engine displayed as an image data. It is possible to provide a plurality of pages of various detailed information including a text data and an animation file as the detailed information associated with the left engine. It should be noted that when the operator has incorrectly entered a detailed information display request instead of a maintenance manual display request, the operator can operate the retry key to return to the process of step s15 via step s25, so that the diagram such as shown in FIG. 14 is displayed, where the operator can enter the maintenance manual display request.

Moreover, when the operator operates the continuation key in step s22 while the detailed information is displayed by the wait process of steps s21 and s22, the CPU 2 as the detailed information display controller detects this operation in the decision process of step s22 and increments the index i value by 1 (step s23). Then, the CPU 2 determines whether the value of the index i has reached the total number n1 of the detailed information pages associated with the component (left engine in this case) which has been displayed on the display screen 8 (step s24).

Unless the value of the index i has reaches the total number n1, the CPU 2 as the detailed information display controller repeats the aforementioned process according to the value of the index i which has been incremented and successively reads from the detailed information storage block of the hard disc drive 5 other detailed information associated with the component which ahs been displayed on the display screen 8, and displays the information on the display screen 8 as shown in FIG. 16. When the value of the index i has reached the total number n1 of pages, the CPU 2 again initializes the value of the index i to 1 (step s19) and repeats display of the detailed information associated with the component which has been displayed on the display screen 8.

Moreover, when the operator operates the retry key during the wait process of steps s21 and s22 so as to terminate display of the detailed information and further operates the retry key repeatedly in steps s16, s13, and s7, the initial screen image appears as shown in FIG. 9.

On the other hand, when the operator enters a maintenance manual display request while the wait process of steps s16 to s18 is repeatedly executed after completion of display of the diagram, the CPU 2 as the manual information display controller detects this operation in the decision process of step s18 and increments the value of the retrieval index i to 1 (step s26). Then, the CPU 2 reads from the manual information storage block of the hard disc drive 5 a data of the i-th page of the basic document associated with the currently displayed component (left engine in this case) and displays the data on the display screen 8 as shown in FIG. 17 (step s27). Then, the CPU 2 enters a wait state. The operator can operate the retry key or the continuation key (steps s28 and s29).

The basic document shown in FIG. 17 shows the left engine (nacelle) and is substantially identical to the contents of the manual prepared by the aircraft manufacturing company. In general, an aircraft manufacturing company issues separate manuals for respective components. Accordingly, when it is known that an error is involved in the pneumatic air system around the left engine, it is not easy to find a manual of the component to be inspected. However, according to the present embodiment, the operator can utilize the total management diagram showing a set of structurally associated components (pneumatic air system in this case) as an index and easily find the target component. Furthermore, through the diagram of this component, the operator can easily find the detailed information or the basic document (manual) of the component and further a specific page of the basic document or the illustrated parts catalogue. Moreover, the detailed information provides an information not given sufficiently in the basic document, which helps young engineers readily understand the contents of the basic document (manual).

When the operator presses the continuation key while the wait process of steps s28 and s29 is repeated, the CPU 2 as the manual information display controller detects this operation in the decision process in step s29 and increments the value of the index i by 1 (step s30). Then, the CPU 2 determines whether the value of the index i the total number n2 of pages of the basic document associated with the component (left engine in this case) which has been displayed on the display screen 8 (step s31). Unless the value of the index i has reached the total number n2 of pages, the CPU 2 as the manual information display controller repeats the aforementioned process according to the value of the incremented index i and successively reads from the manual information storage block of the hard disc drive 5 contents of the basic document associated with the component which has been displayed on the display screen 8, so as to be displayed on the display screen 8. Moreover, when the value of the index i has reached the total number n2 of pates, the CPU 2 again initializes the value of the index i to 1 (step s26) and repeats display of the basic document associated with the component which has been displayed on the display screen 8.

When the operator operates the retry key to terminate display of the basic document during the wait process of steps s28 and s29, and further operates the retry key in steps s16, s13, and s7, the initial screen image of FIG. 9 appears.

On the other hand, when the total management drawing (see FIG. 11) is selected by moving the cursor and performing click operation during the wait process of steps s7 to s9 after display of the group of the total management diagram is complete, the CPU 2 detects this operation in the decision process of step s9 and sets 1 to flag F indicating that a total management drawing is being displayed (step s11).

Next, the CPU 2 as the total management display controller reads from the total management storage block of the hard disc drive 5 as the nonvolatile storage unit the total management drawing corresponding to the location system flow of the pneumatic air system, i.e., ATA chapter 36, and displays it on the display screen 8 as shown in FIG. 18 (step s33). Then the CPU 2 enters a wait state. The operator can operate the retry key or move the cursor to specify a detailed portion to be selected in the drawing currently displayed (steps s34 to s35).

As shown in FIG. 18, this total management drawing clearly shows only the air flow from the right and left engines as air supply sources, the air flow from the auxiliary power unit, and the locations where the air is used, as well as the interrelationships between the locations (air flow direction, without showing complicated mechanical elements and electric wiring and linkage not directly associated with the air flows. That is, those components having little relationship with the target component are not involved in the drawing. This facilitates young engineers having little experience to easily understand the configuration of the pneumatic air system. Moreover, unlike the aforementioned total management diagram, the engineers can easily grasp specific shapes of components of the pneumatic air system and locations of pipes associated with the pneumatic air system as well as interrelationships between the respective components.

Furthermore, since only the components associated with the pneumatic air system are displayed, there is no case that unnecessary lines are overlaid and the components can be displayed at a sufficient interval, which facilitates to specify a component which the operator further wants to know details about.

It should be noted that when the operator has specified a wrong component, the operator can operate the retry key to return up to the process of step s6, where a list of the total management block as shown in FIG. 11 appears on the display screen 8.

Furthermore, while the total management drawing as shown in FIG. 18 is displayed on the display screen 8, the operator can specify a component to be detailed by moving the cursor to the location of the component and performing clicking. The CPU 2 as the partial management display controller detects this operation in the decision process of step s35 and reads from the detailed management partial management storage block of the hard disc drive 5 as the nonvolatile storage means a partial management drawing corresponding to the component clicked. The CPU 2 displays the partial management drawing on the display screen 8 as shown in FIG. 19 (step s36) and enters a wait state. The operator can operate the retry key or enters a detailed information display request or a maintenance manual display request by operating the keyboard 10 or the track pad 11 (steps s37 to s39).

The partial management drawing of FIG. 19 appears on the display screen 8 when the position of the left engine is clicked on the total management drawing shown in FIG. 18. This partial management drawing clearly shows the left engine details in a perspective view. The parts which cannot be viewed in the perspective view are detached outside and shown in an enlarged view. Thus, details can easily be viewed as compared to the manual (basic document) prepared by an aircraft manufacturer.

It should be noted that when the operator has incorrectly specified a component, he can operate the retry key to return to step s33 to display the total management drawing as shown in FIG. 18, where he can again specify a component.

While the partial management drawing of FIG. 19 is displayed, the operator can enter a detailed information display request by operating the keyboard 10 or the track pad 11. The CPU 2 as the detailed information display controller detects this operation in the decision process of step s38. Alternatively, the operator can enter a manual display request. The CPU 2 as the manual information display controller detects the manual display request in the decision process of step s39.

The processes associated with the detailed information display and the manual information display are identical to the processes performed for a diagram display, i.e., the processes explained with reference to FIG. 6 and FIG. 7.

Figure 6:
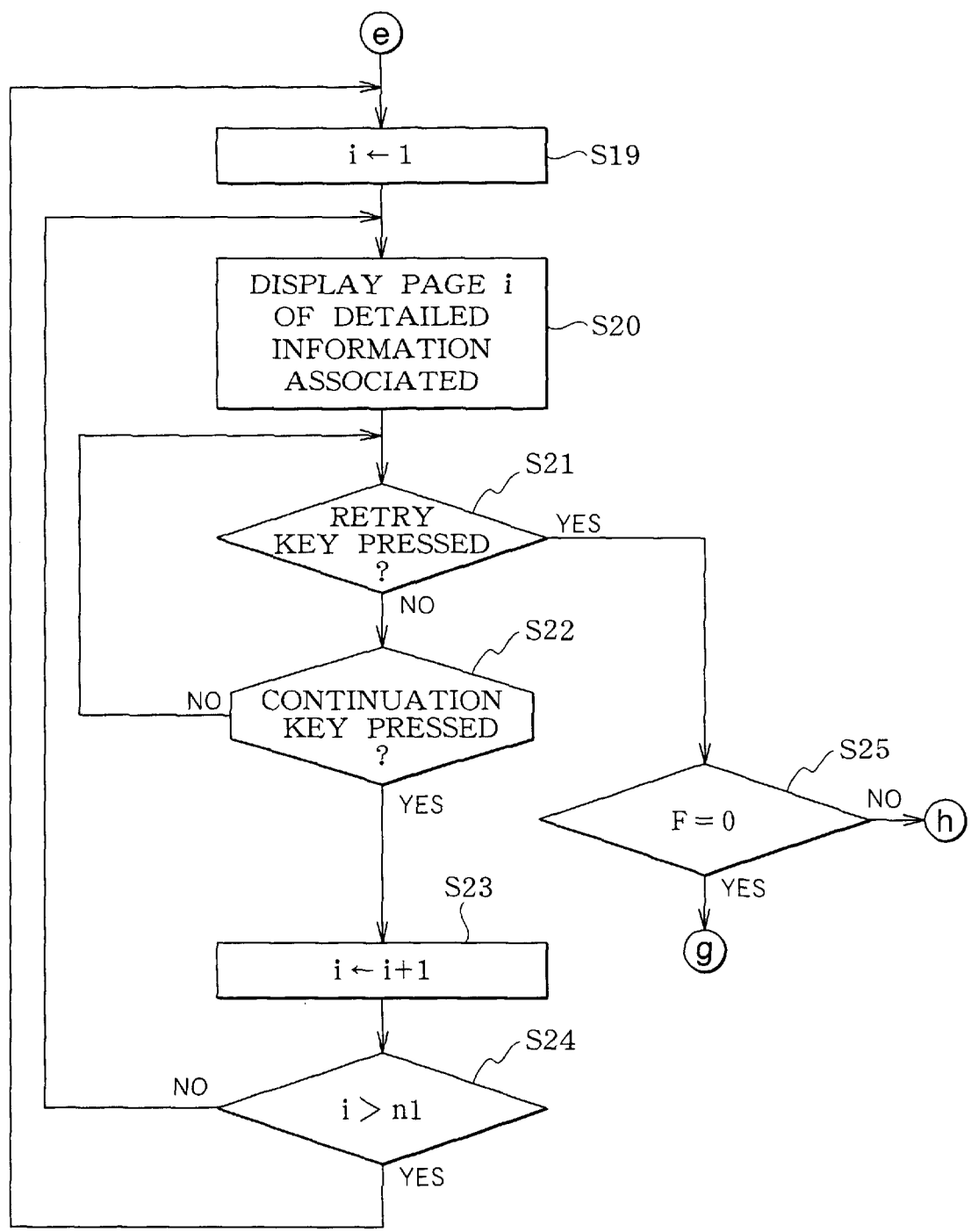
FIG. 6 is a continuation of the flowchart of FIG. 5.
Figure 7:
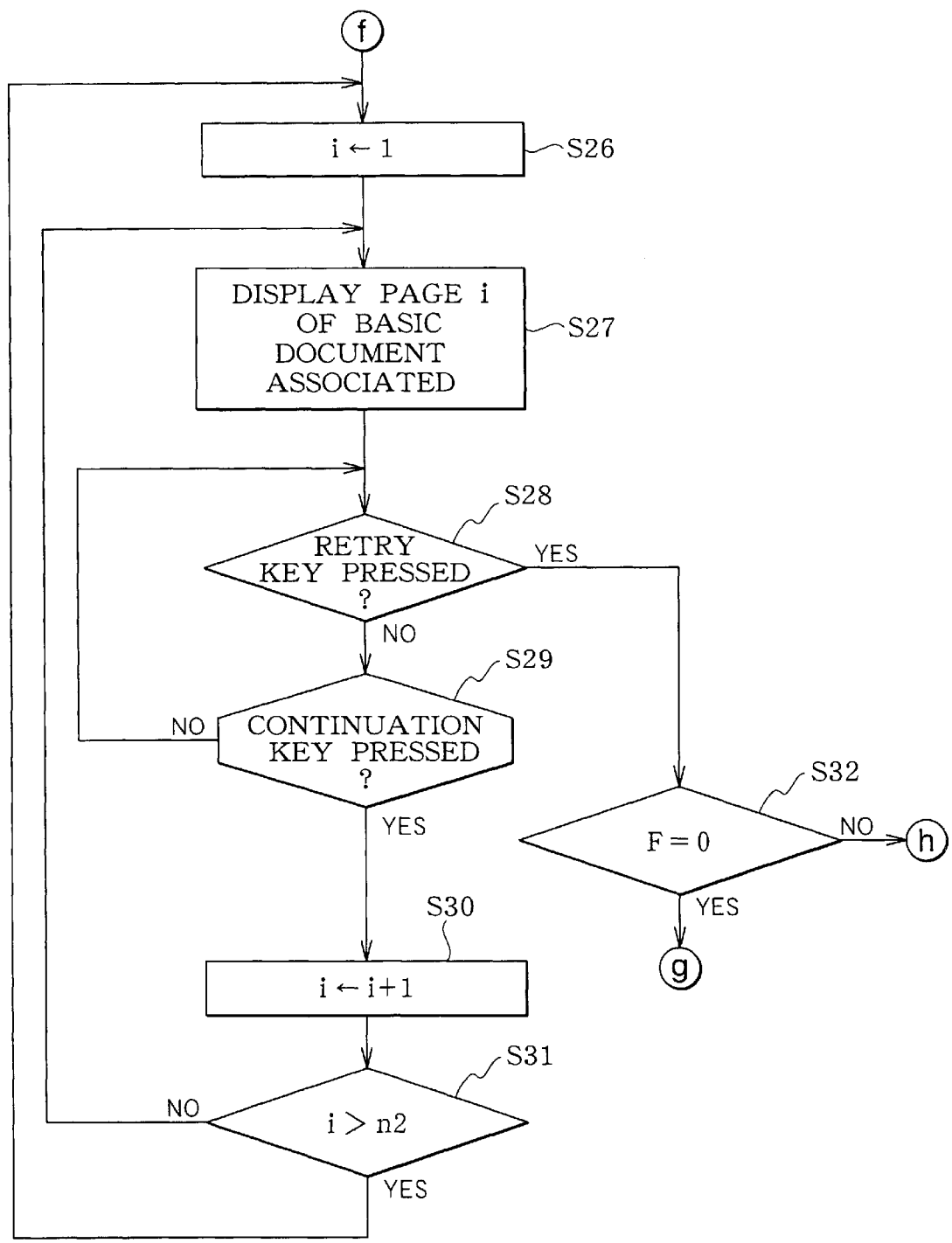
FIG. 7 is a continuation of the flowchart of FIG. 6.
Figure 8:
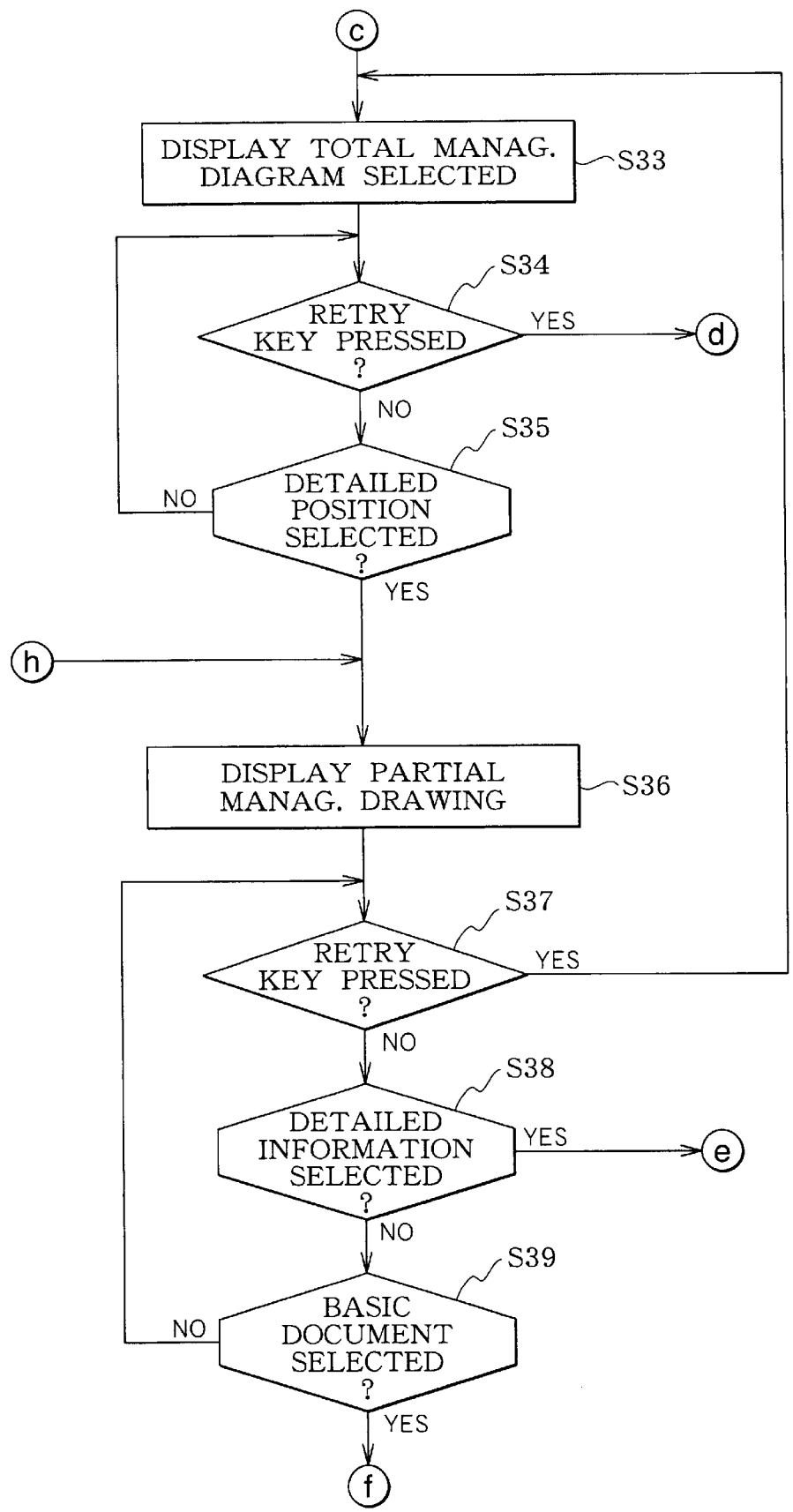
FIG. 8 is a continuation of the flowchart of FIG. 7.

It should be noted that when the processes of FIG. 6 and FIG. 7 are performed while a partial management drawing is on the display screen 8, the value of flag F is 1. Accordingly, if the CPU 2 detects a retry key operation in the decision process of step s21 or s28, control is passed via step s25 or s32 to the process of step s36, where the partial management drawing as shown in FIG. 19 again appears on the display screen 8.

Thus, even young engineers having little experience can find a necessary page of the basic document (manual) and illustrated parts catalogue in a short time.

In this embodiment, detailed information items are used in common by the partial management diagrams and drawings but they can also be separated so as to be dedicated to the diagrams and the drawings.

In the aforementioned embodiment, display of a partial management drawing or diagram is switched to pages of a detailed information or manual information associated with the partial management drawing or diagram which are successively displayed according to the value of the index i. However, it is also possible to display a guidance massage, i.e., a message for the interactive operation, on the display screen 8 showing a total management drawing or diagram or a partial management drawing or diagram, thereby enabling the operator to perform an interactive operation through the man-machine interface.

Hereinafter, a brief explanation will be given on a configuration example for performing the interactive operation.

Figure 20:
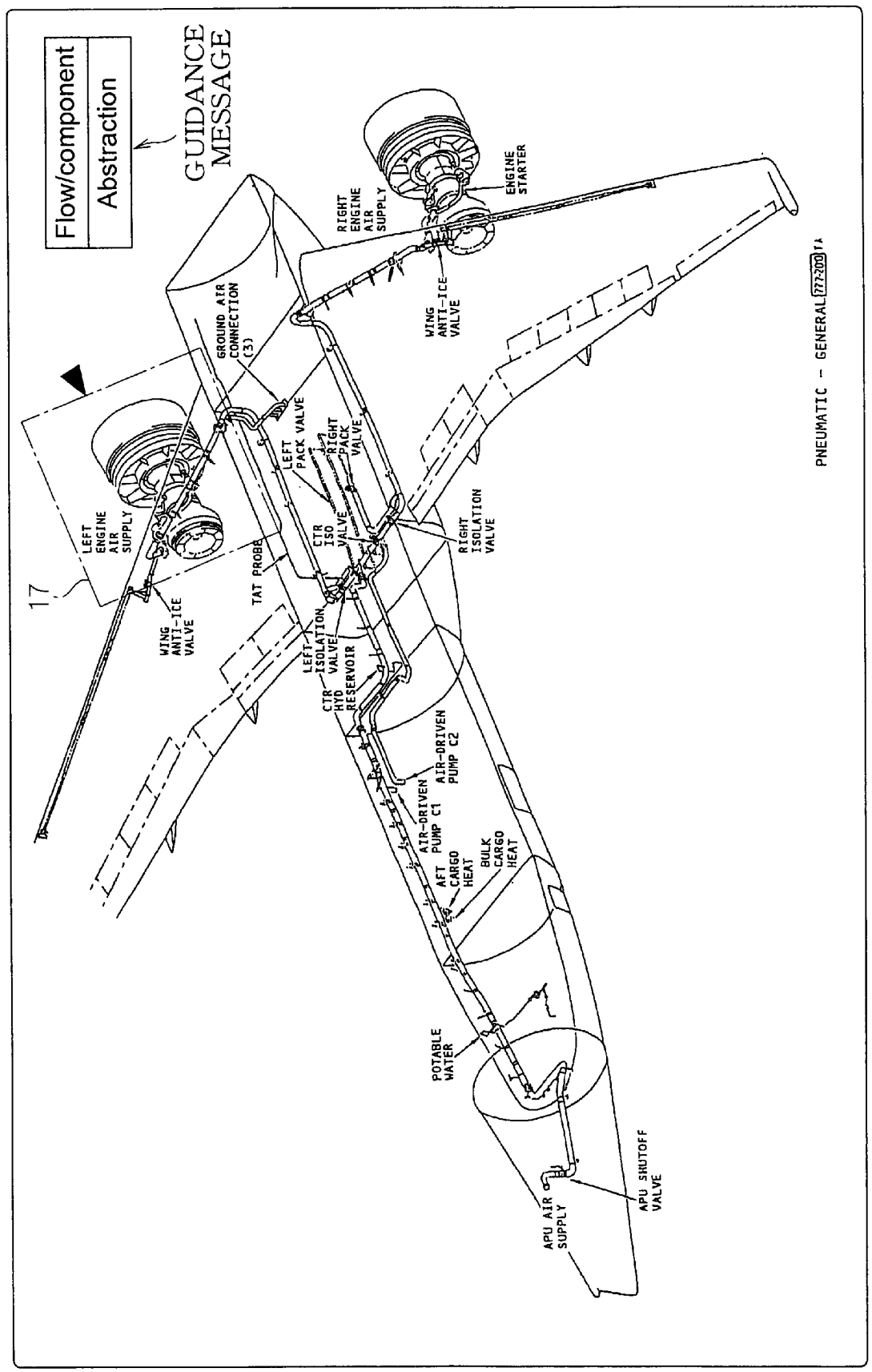
FIG. 20 shows an example of a total management drawing displayed in a maintenance manual interface system according to another embodiment.

Firstly, on a total management drawing as shown in FIG. 20, the operator moves the cursor to a desired position. Then, a rectangular frame 17 appears to surround a component currently selected by this cursor positioning. Thus, the CPU 2 displays the rectangular frame 17 to define the component selected, so that the operator can clearly know what is to be selected. At this stage, if a wrong component is surrounded by the rectangular frame, the operator can know that he should move the cursor. This can reduce the number of incorrect mouse click operations. FIG. 20 shows an example in which the cursor is positioned in the vicinity of the left engine.

Figure 21:
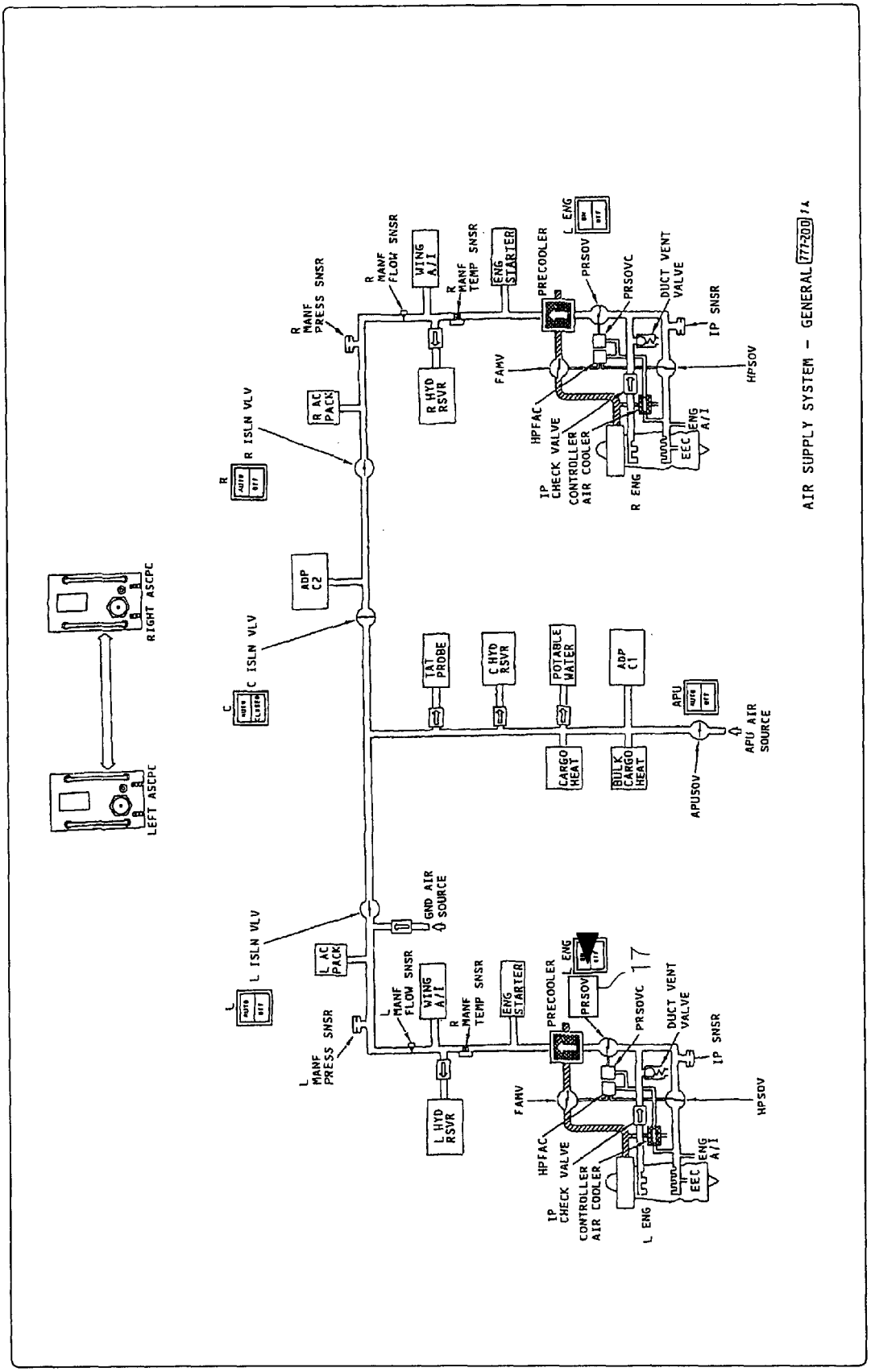
FIG. 21 shows an example of a total management diagram displayed in the aforementioned maintenance manual interface system.

Here, simultaneously with the rectangular frame 17, a guidance message consisting of a plurality of items appears on the display screen 8 for the interactive operation. Here, the operator selects one of the items in the message. For example, if the operator selects "Abstraction" and the operator operation detection program detects this operation, then the CPU 2 displays on the display screen 8 a total management diagram of the left engine as shown in FIG. 21 (identical to FIG. 13). On this screen also, when the cursor is moved, a component currently selected is surrounded by the rectangular frame 17 to show what is currently selected. FIG. 21 shows an example when the cursor is moved to the pressure regulating and shutoff valve.

Figure 22:
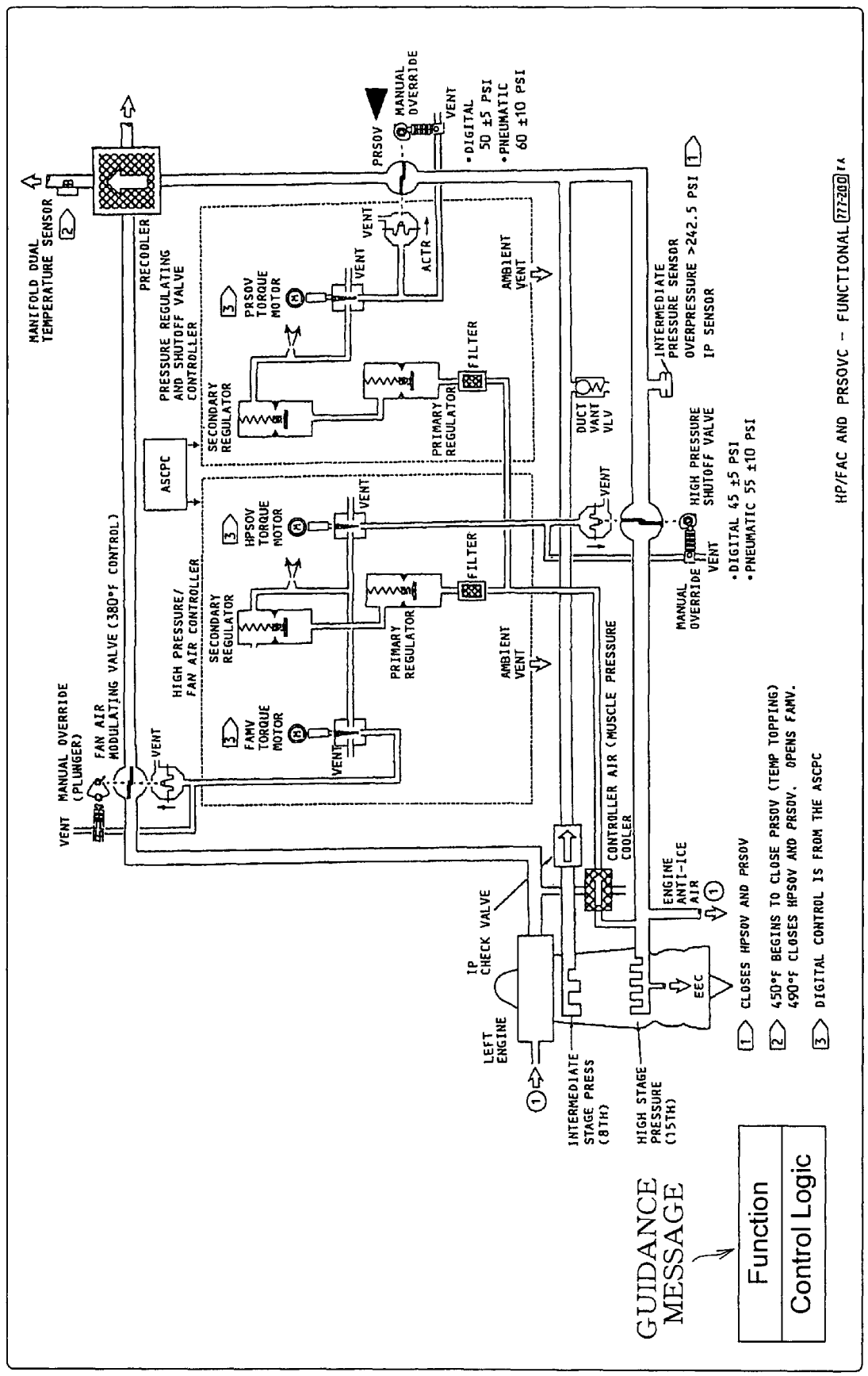
FIG. 22 shows another example of a detailed information displayed in the aforementioned maintenance manual interface system.

Here, if the operator performs a mouse click while the cursor is located at the pressure regulating and shutoff valve, i.e., if the selection of the pressure regulating and shutoff valve is confirmed, the operator operation detection program detects this operation and the CPU 2 displays a detailed information about the pressure regulating and shutoff valve as shown in FIG. 22 (identical to FIG. 14).

Figure 23:
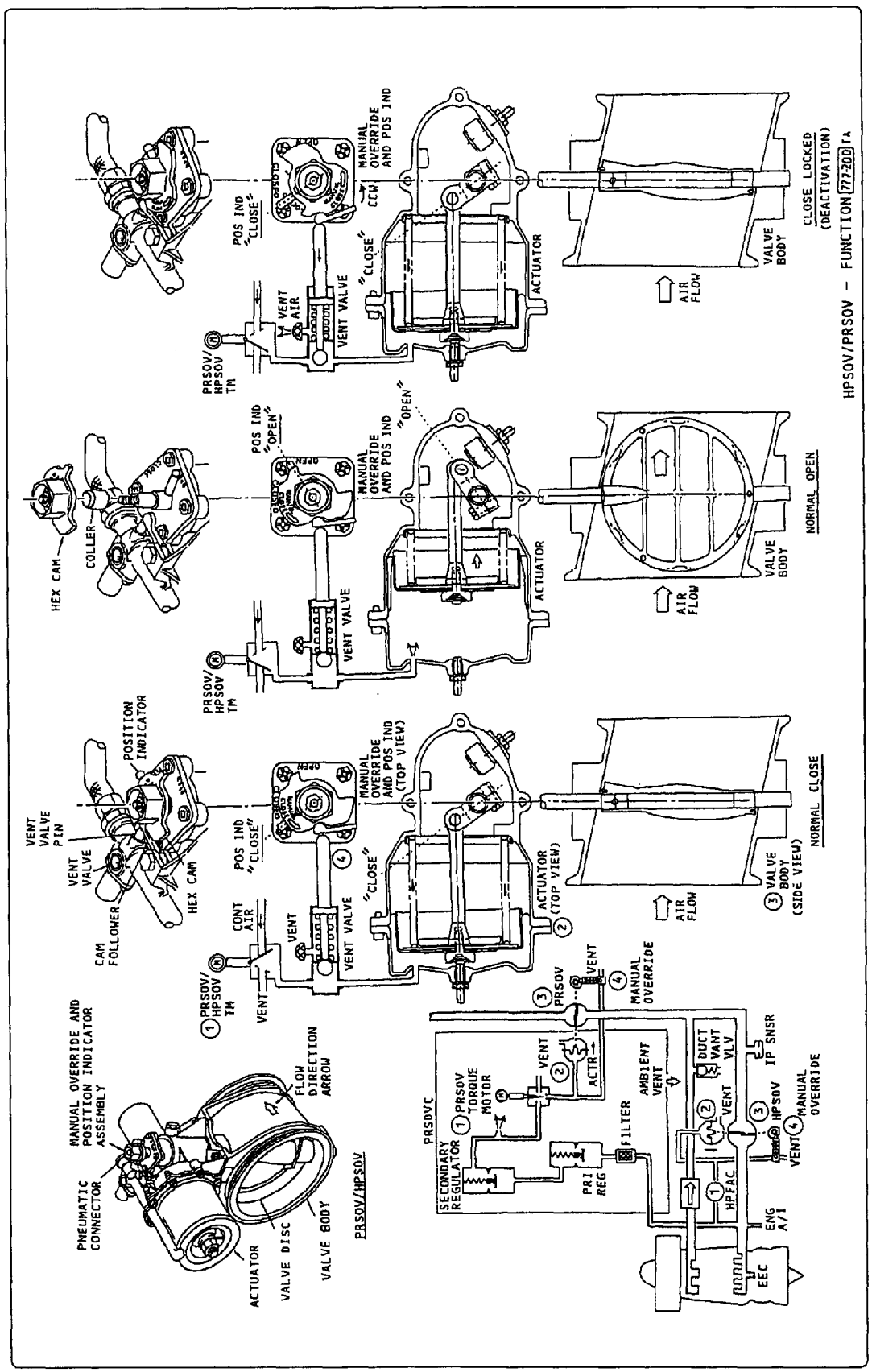
FIG. 23 shows still another example of a detailed information displayed in the aforementioned maintenance manual interface system.

On this screen, a guidance message for the interactive operation is displayed according to the location of the cursor. For example, when the cursor indicates the pressure regulating and shutoff valve, a guidance message consisting of "Function" and "Control Logic" appears on the screen. When the operator selects the "Function", the operator operation detection program detects this operation and the CPU 2 displays on the display screen 8 a detailed information associated with the shutoff valve and the shutoff valve controller, i.e., the configuration of the shutoff valve and the open/close operation state (function) of the shutoff valve as shown in FIG. 23 (identical to FIG. 15).

Figure 24:
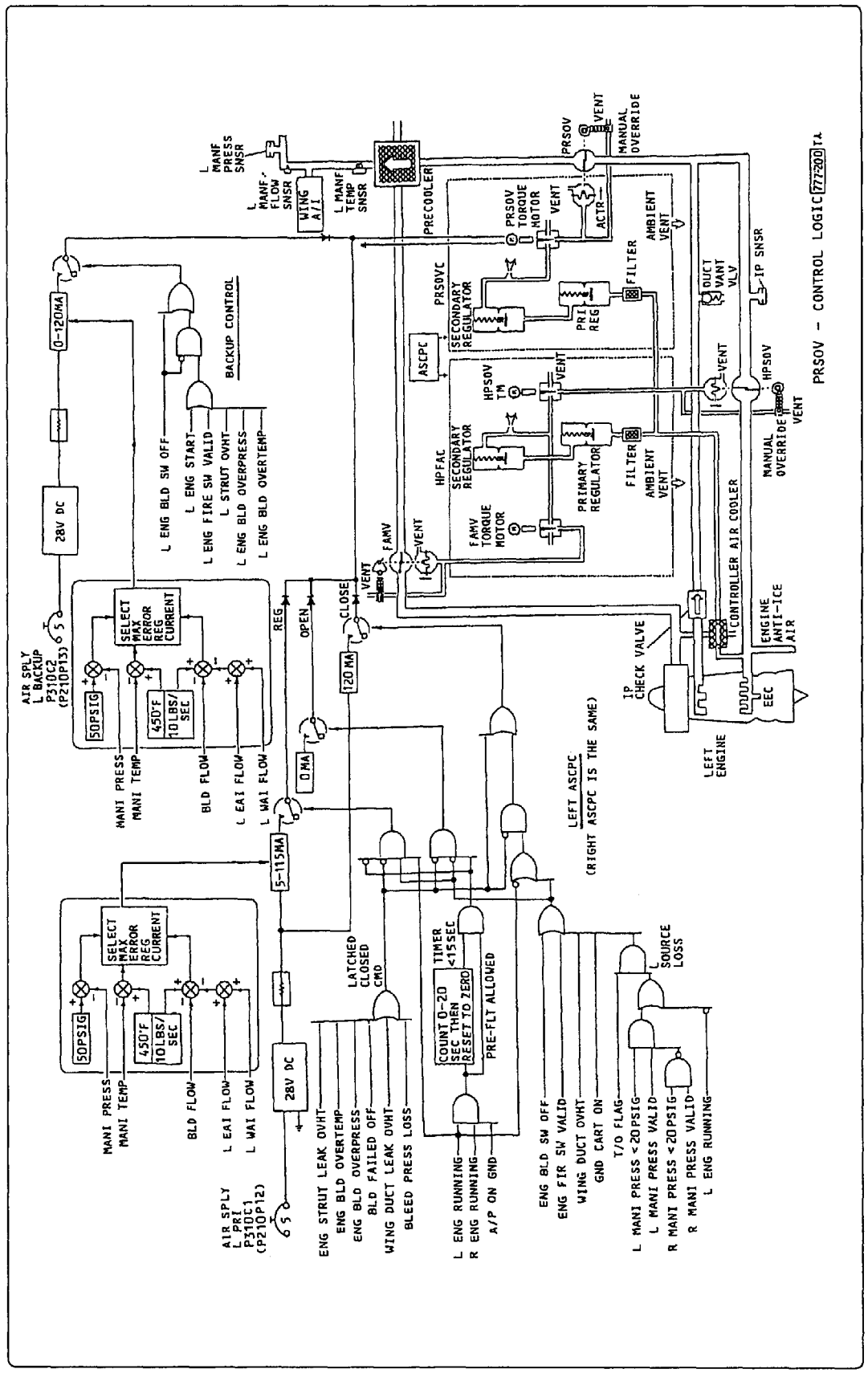
FIG. 24 shows yet another example of a detailed information displayed in the aforementioned maintenance manual interface system.

On the other hand, when the operator selects "Control Logic" in the guidance message, the operator operation detection program detects this operation and the CPU 2 displays on the display screen 8 a detailed information on the pressure regulating and shutoff valve, i.e., a diagram showing an electric and mechanical connection between the electric system and the hydraulic system as shown in FIG. 24 (identical to FIG. 16). At this stage, the operator can enters a maintenance manual display request by operating the keyboard 10 or the track pad 11 so as to display a manual information as shown in FIG. 17, i.e., contents of the basic document associated with the left engine including a configuration around the pressure regulating and shutoff valve.

Figure 25:
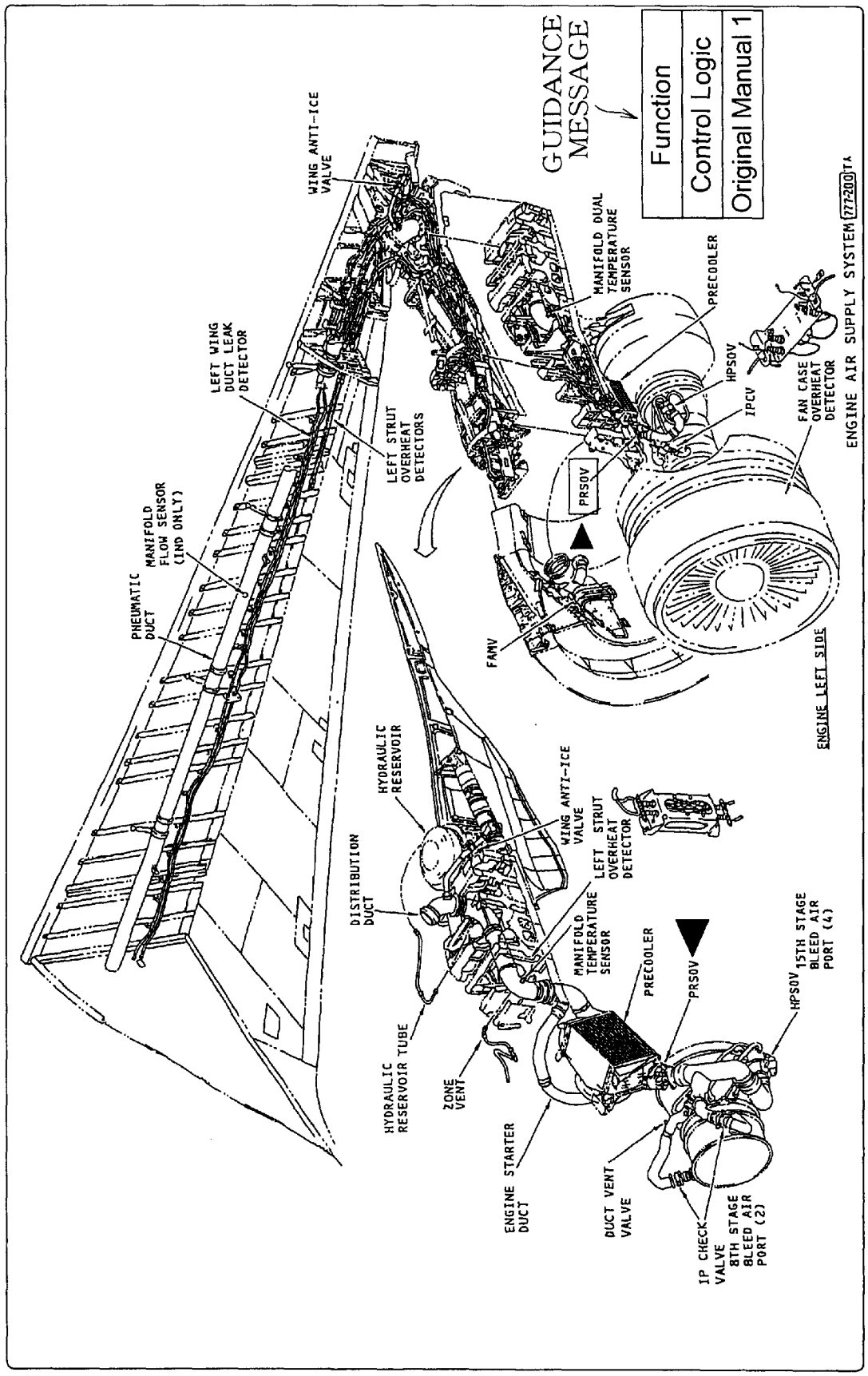
FIG. 25 shows an example of a partial management drawing displayed in the aforementioned maintenance manual interface system.

Moreover, when the total management drawing as shown in FIG. 20 is displayed on the screen and the left engine is selected, the guidance message consists of "Flow/component" and "Abstraction". If the operator selects "Flow/component", then a partial management drawing of the left engine as shown in FIG. 25 (identical to FIG. 19) is displayed. On this screen also, the operator can select the pressure regulating and shutoff valve by moving the cursor to it and operating a click, so as to display the detailed information on the pressure regulating and shutoff valve as shown in FIG. 22.

It should be noted that when a partial management drawing such as FIG. 25 includes a drawing of the specified component together with a partially enlarged drawing, a component (such as the pressure regulating and shutoff valve) can be specified either from the main drawing or from the partially enlarged drawing. Moreover, it is also possible to configure the system so that when a component is selected in the main drawing or the partially enlarged drawing, another cursor is displayed at the corresponding position of the main or the partially enlarged drawing.

Furthermore, it is also possible to configure the system so that at the stage when the partial management drawing of the left engine as shown in FIG. 25 is displayed, the operator can specify a position and select an item in the guidance message, so as to selectively display various detailed information corresponding to a specific part (such as the pressure regulating and shutoff valve). For example, in the sate of FIG. 25, if the cursor is located for the pressure regulating and shutoff valve and "Function" is selected in the guidance message, then the detailed information associated of the operation state (function) of the shutoff valve as shown in FIG. 23; and if "Control Logic" is selected in the guidance message, then the detailed information of the pressure regulating and shutoff valve as shown in FIG. 24, i.e., electric and mechanical connection between the electric system and hydraulic system are shown in a diagram. Furthermore, when "Original Manual 1" is selected, a manual information as shown in FIG. 17, i.e., contents of the basic document (manual) associated with the left engine containing a configuration around the pressure regulating and shutoff valve is displayed.

Explanation has thus far been given on the maintenance manual interface system and the magnetic recording medium for the maintenance manual interface system according to the embodiments of the present invention to be utilized for maintenance of an aircraft or education of maintenance engineers. The present invention can also be applied to other transportation means including an automobile, a ship and space shuttle, or machines having a complicated structure.

In the case of an automobile, a ship, or other transportation means or machines having a complicated structure, as the classification of the components to replace the ATA of the aircraft, for example, it is possible to use a field classification such as a hydraulic system and an electric system, or a mechanical classification such as a drive system, a control system, a steering system, and an air conditioning system.

Even when these classifications are used, it is possible to provide the aforementioned total management diagram and drawing, partial management diagrams and drawings, and detailed information and manual information systematized in a hierarchy.

The maintenance manual interface system according to the present invention includes a nonvolatile storage unit containing an image data expressing total management drawings of respective sets of structurally related components in a sophisticated system such as an aircraft and other transporters, the sets corresponding to respective maintenance request information. When a maintenance request information is entered to the interface system, the total management display controller displays only a total management drawing of the corresponding set. Accordingly, a maintenance engineer can clearly understand the set without being bothered by drawing lines which are not directly relevant to the set.

Moreover, the maintenance engineer can specify a particular position, i.e., a particular component of the set, on the total management drawing of the set on the display screen, so that the partial management drawing display means reads out a corresponding drawing from the partial management storage block of the nonvolatile storage unit and displays the drawing on the display screen. Thus, the engineer can easily check details of the component without performing any complicated retrieval.

The engineer can further enter a detailed information display request. Then, the detailed information display controller reads out a detailed information associated with the component currently displayed on the display screen, from the detailed information storage block of the nonvolatile storage unit, and displays the detailed information on the display screen. Thus, the engineer, i.e., the operator, can easily reference the detailed information including a text information such as an explanation on functions and remarks as well as operation states of a movable part in animation.

Moreover, when the engineer wants to reference a maintenance manual associated with the component currently displayed on the display screen, what is to be done is only to enter a manual information display request to the interface system. Then, the manual information display controller automatically reads out information of a necessary manual and displays it on the display screen. This eliminates the complicated retrieval required when using a paper manual. A maintenance work should be performed according to the specification and information described in an authorized maintenance manual. With the help of the total management display controller, the partial management display controller, and the manual information display controller, even an operator having little maintenance experience, according to a maintenance request information, can easily identify a necessary page of a maintenance manual or parts catalogue attached to the maintenance manual in a short time. Moreover, since the detailed information storage block of the nonvolatile memory can contain an additional information to suffice a shortage of the manuals prepared by manufactures of the system. This helps the engineer readily perform a maintenance work.

Moreover, instead of the total management drawing and the partial management drawing showing a set of structurally related components, it is possible to store in the total management storage block and the partial management storage block, total management diagrams showing electrical and mechanical connections between a plurality of sets as well as partial management diagrams showing electrical and mechanical structures of the respective components. This helps a maintenance engineer easily understand a functional connection between components such as an electric circuit, a hydraulic circuit, and a pneumatic piping which cannot be sufficiently expressed in the drawings including a perspective view and a plan view.

Moreover, the total management drawing and the partial management drawing are displayed by utilizing a three-dimensional image data. This helps a maintenance engineer readily understand the three-dimensional configuration of a component or a set of components.

Moreover, the present invention provides a program recording medium containing a computer program product for realizing the aforementioned maintenance manual interface system through a computer. Only by installing the contents of the recording medium, it is possible to utilize a desktop computer, a laptop computer, a workstation as the maintenance manual interface system. Thus, as compared to constituting a dedicated system, it is possible to realize the maintenance manual interface system with a very small investment.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A maintenance manual interface system for retrieving and identifying a paragraph (page) of a maintenance manual to be referenced in response to a maintenance request information, the interface system comprising:

a nonvolatile storage unit including: a total management storage block containing an image data of total management drawings, each showing a set of structurally related components which set is specified by the maintenance request information; a partial management storage block containing an image data of partial management drawings corresponding to the respective components of the set; a detailed information storage block containing a detailed information associated with the respective components of the set; and a manual information storage block containing paragraphs of the maintenance manual stored corresponding to the respective components;

a display screen for displaying an information;

a main controller for data processing; and a man-machine interface having a function for entering a maintenance request information, a detailed information display request, and a maintenance manual display request into the main controller and a function for specifying a position on the display screen, wherein the main controller includes:

a total management storage display controller for detecting a maintenance request information entered through the man-machine interface, reading out a total management drawing corresponding to the maintenance request information from the total management storage block, and displaying the total management drawing on the display screen;

a partial management storage display controller for detecting a position specification on the currently displayed drawing through the man-machine interface, reading out a partial management drawing corresponding to a component specified by the position specification, from the partial management storage block, and displaying the partial management drawing on the display screen;

a detailed information display controller for detecting a detailed information display request from the man-machine interface, reading out a detailed information associated with the currently displayed partial management drawing, from the detailed information storage block, and displaying the detailed information on the display screen; and a manual information display controller for detecting a manual information display request from the man-machine interface, reading out a paragraph of the maintenance manual associated with the currently displayed detailed drawing, and displaying the paragraph on the display screen.

2. A maintenance manual interface system as claimed in claims 1, wherein the total management drawings and the partial management drawings are stored as a three-dimensional image data.

3. A maintenance manual interface system for retrieving and identifying a paragraph of a maintenance manual to be referenced in response to a maintenance request information, the interface system comprising:

a nonvolatile storage unit including: a total management storage block containing an image data of total management diagrams showing electrical and mechanical connections, each diagram corresponding to a set of structurally related components which set is specified by the maintenance request information; a partial management storage block containing an image data of partial management diagrams showing electrical and mechanical structures of the respective components of the set; a detailed information storage block containing a detailed information associated with the respective components of the set; and a manual information storage block containing paragraphs of the maintenance manual stored corresponding to the respective components;

a display screen for displaying an information;

a main controller for data processing; and a man-machine interface having a function for entering a maintenance request information, a detailed information display request, and a maintenance manual display request into the main controller and a function for specifying a position on the display screen, wherein the main controller includes:

a total management storage display controller for detecting a maintenance request information entered through the man-machine interface, reading out a total management diagram corresponding to the maintenance request information from the total management storage block, and displaying the total management diagram on the display screen;

a partial management storage display controller for detecting a position specification on the currently displayed drawing through the man-machine interface, reading out a partial management diagram corresponding to a component specified by the position specification, from the partial management storage block, and displaying the partial management diagram on the display screen;

a detailed information display controller for detecting a detailed information display request from the man-machine interface, reading out a detailed information associated with the currently displayed partial management diagram, from the detailed information storage block, and displaying the detailed information on the display screen; and a manual information display controller for detecting a manual information display request from the man-machine interface, reading out a paragraph of the maintenance manual associated with the currently displayed detailed diagram, and displaying the paragraph on the display screen.

4. A maintenance manual interface system for retrieving and identifying a paragraph of a maintenance manual to be referenced in response to a maintenance request information, the interface system comprising:

a nonvolatile storage unit including: a total management storage block containing an image data of total management drawings and total management diagrams showing electrical and mechanical connections, each drawing and diagram corresponding to a set of structurally related components which set is specified by the maintenance request information; a partial management storage block containing an image data of partial management drawings and diagrams showing electrical and mechanical structures of the respective components of the set; a detailed information storage block containing a detailed information associated with the respective components of the set; and a manual information storage block containing paragraphs of the maintenance manual stored corresponding to the respective components;

a display screen for displaying an information;

a main controller for data processing; and a man-machine interface having a function for entering a maintenance request information, a display state specification request for specifying a drawing or a diagram, a detailed information display request, and a maintenance manual display request into the main controller and a function for specifying a position on the display screen, wherein the main controller includes:

a total management storage display controller for detecting a maintenance request information and display state specification request entered through the man-machine interface, and if the display state specification request specifies a drawing, then reading out a total management drawing corresponding to the maintenance request information from the total management storage block, and displaying the total management drawing on the display screen, and if the display state specification request specifies a diagram, then reading out a total management diagram corresponding to the maintenance request information from the total management storage block, and displaying the total management diagram on the display screen, a partial management storage display controller for detecting a position specification on the currently displayed drawing or diagram through the man-machine interface, and in the case of position specification on the drawing, reading out a partial management drawing corresponding to a component specified by the position specification, from the partial management storage block, and displaying the partial management drawing on the display screen, and in the case of position specification on the diagram, reading out a partial management diagram corresponding to a component specified by the position specification, from the partial management storage block, and displaying the partial management diagram on the display screen;

a detailed information display controller for detecting a detailed information display request from the man-machine interface, reading out a detailed information associated with the currently displayed partial management drawing or diagram, from the detailed information storage block, and displaying the detailed information on the display screen; and a manual information display controller for detecting a manual information display request from the man-machine interface, reading out a paragraph of the maintenance manual associated with the currently displayed detailed drawing or diagram, and displaying the paragraph on the display screen.

5. A maintenance manual interface system as claimed in claims 4, wherein the total management drawings and the partial management drawings are stored as a three-dimensional image data.

6. A program-recorded medium containing a computer program product for implementing through a computer a maintenance manual interface system for retrieving and specifying a paragraph of a maintenance manual to be referenced according to a maintenance request information, the program-recorded medium containing:

a total management storage file containing an image data of total management drawings, each showing a set of structurally related components which set is specified by the maintenance request information;

a partial management storage file containing an image data of partial management drawings corresponding to the respective components;

a detailed information storage file containing a detailed information associated with the respective components;

a manual information storage file containing paragraphs of the maintenance manual stored corresponding to the respective components;

an operator operation detection program for recognizing an operation by an operator on a man-machine interface provided in the computer and detecting a maintenance request information, a detailed information display request, and a maintenance manual display request which have been entered as well as a position of a position specification performed on a display screen provided in the computer;

a total management storage display program activated upon detection of an entry of a maintenance request information by the operator operation detection program, for reading out a total management drawing corresponding to the maintenance request information from the total management storage file and displaying the total management drawing on the display screen;

a partial management storage display program activated upon detection of a position specification on a currently displayed total management drawing by the operator operation detection program, for reading out a partial management drawing corresponding to a component specified by the position specification, from the partial management storage file and displaying the partial management drawing on the display screen;

a detailed information display program activated upon detection of an entry of a detailed information display request by the operator operation detection program, for reading out a detailed information associated with the currently displayed partial management drawing, from the detailed information storage file and displaying the detailed information on the display screen;

a manual information display program activated upon detection of an entry of a manual information display request by the operator operation detection program, for reading out a paragraph of the maintenance manual associated with the currently displayed detailed drawing and displaying the paragraph on the display screen; and an installation program for installing the total management storage file, the partial management storage file, the detailed information storage file, and the manual information storage file into the computer.

7. A program-recorded medium for the maintenance manual interface system as claimed in claim 6, wherein the total management drawings and the partial management drawings are stored as a three-dimensional image data.

8. A program-recorded medium containing a computer program product for implementing through a computer a maintenance manual interface system for retrieving and specifying a paragraph of a maintenance manual to be referenced according to a maintenance request information, the program-recorded medium containing:

a total management storage file containing an image data of total management diagrams, each showing electrical and mechanical structures of a set of structurally related components which set is specified by the maintenance request information;

a partial management storage file containing an image data of partial management diagrams showing electrical and mechanical structures of the respective components;

a detailed information storage file containing a detailed information associated with the respective components;

a manual information storage file containing paragraphs of the maintenance manual stored corresponding to the respective components;

an operator operation detection program for recognizing an operation by an operator on a man-machine interface provided in the computer and detecting a maintenance request information, a detailed information display request, and a maintenance manual display request which have been entered as well as a position of a position specification performed on a display screen provided in the computer;

a total management storage display program activated upon detection of an entry of a maintenance request information by the operator operation detection program, for reading out a total management diagram corresponding to the maintenance request information from the total management storage file and displaying the total management diagram on the display screen;

a partial management storage display program activated upon detection of a position specification on a currently displayed total management diagram by the operator operation detection program, for reading out a partial management diagram corresponding to a component specified by the position specification, from the partial management storage file and displaying the partial management diagram on the display screen;

a detailed information display program activated upon detection of an entry of a detailed information display request by the operator operation detection program, for reading out a detailed information associated with the currently displayed partial management diagram, from the detailed information storage file and displaying the detailed information on the display screen;

a manual information display program activated upon detection of an entry of a manual information display request by the operator operation detection program, for reading out a paragraph of the maintenance manual associated with the currently displayed detailed diagram and displaying the paragraph on the display screen; and an installation program for installing the total management storage file, the partial management storage file, the detailed information storage file, and the manual information storage file into the computer.

9. A program-recorded medium containing a computer program product for implementing through a computer a maintenance manual interface system for retrieving and specifying a paragraph of a maintenance manual to be referenced according to a maintenance request information, the program-recorded medium containing:

a total management storage file containing an image data of total management drawing, each showing an entire configuration of a set of structurally related set corresponding to the maintenance request information and total management diagrams showing electrical and mechanical structures of the respective sets;

a partial management storage file containing an image data of partial management drawings and diagrams showing electrical and mechanical structures of the respective components;

a detailed information storage file containing a detailed information associated with the respective components;

a manual information storage file containing paragraphs of the maintenance manual stored corresponding to the respective components;

an operator operation detection program for recognizing an operation by an operator on a man-machine interface provided in the computer and detecting a maintenance request information, a display state specification request for specifying a drawing or diagram, a detailed information display request, and a maintenance manual display request which have been entered as well as a position of a position specification performed on a display screen provided in the computer;

a total management storage display program activated upon detection of entry of a maintenance request information and a display state specification request by the operator operation detection program, so that if the display state specification requests specifies a drawing, a total management drawing corresponding to the maintenance request information is read out from the total management storage file to be displayed on the display screen, and if the display state specification request specifies a diagram, a total management diagram corresponding to the maintenance request information is read out from the total management storage file and displayed on the display screen;

a partial management storage display program activated upon detection of a position specification on a currently displayed total management drawing or diagram by the operator operation detection program, so that if a total management drawing is being displayed, a partial management drawing corresponding to a component specified by the position specification is read out from the partial management storage file and displayed on the display screen, and if a total management diagram is being displayed, a partial management diagram corresponding to a component specified by the position specification is read out from the partial management storage file and displayed on the display screen;

a detailed information display program activated upon detection of an entry of a detailed information display request by the operator operation detection program, for reading out a detailed information associated with the currently displayed partial management drawing or diagram, from the detailed information storage file and displaying the detailed information on the display screen;

a manual information display program activated upon detection of an entry of a manual information display request by the operator operation detection program, for reading out a paragraph of the maintenance manual associated with the currently displayed detailed drawing or diagram and displaying the paragraph on the display screen; and an installation program for installing the total management storage file, the partial management storage file, the detailed information storage file, and the manual information storage file into the computer.

10. A program-recorded medium for the maintenance manual interface system as claimed in claim 8, wherein the total management drawings and the partial management drawings are stored as a three-dimensional image data.

* * * * *

UNITED STATES PATENT AND TRADEMARK OFFICE
CERTIFICATE OF CORRECTION

PATENT NO.    : 6,625,618 B1
DATED         : September 23, 2003
INVENTOR(S)   : T. Arai It is certified that error appears in the above-identified patent and that said Letters Patent is hereby corrected as shown below:

Column 18,
Line 50, "claims" should be -- claim --.

Column 20,
Line 47, "claims" should be -- claim --.

Column 24,
Line 23, "claim 8" should be -- claim 9 --.

Signed and Sealed this

Fifteenth Day of June, 2004

JON W. DUDAS
*Acting Director of the United States Patent and Trademark Office*